United States Patent
Ekbote et al.

(10) Patent No.: US 9,504,105 B2
(45) Date of Patent: Nov. 22, 2016

(54) ON-TIME CONTROL FOR SWITCHED MODE POWER SUPPLIES

(71) Applicant: Cree, Inc., Durham, NC (US)

(72) Inventors: Ashish Ekbote, Carpinteria, CA (US); Mike Walters, Apex, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/296,196

(22) Filed: Jun. 4, 2014

(65) Prior Publication Data

US 2015/0357899 A1    Dec. 10, 2015

(51) Int. Cl.
*H02M 7/44* (2006.01)
*H05B 33/08* (2006.01)
*H02M 3/158* (2006.01)
*H02M 3/156* (2006.01)
*H02M 7/217* (2006.01)
*H02M 1/42* (2007.01)
*H02M 1/00* (2006.01)

(52) U.S. Cl.
CPC ....... *H05B 33/0815* (2013.01); *H02M 1/4225* (2013.01); *H02M 1/4258* (2013.01); *H02M 3/156* (2013.01); *H02M 3/158* (2013.01); *H02M 7/217* (2013.01); *H02M 7/2176* (2013.01); *H02M 2001/0025* (2013.01); *Y02B 70/126* (2013.01)

(58) Field of Classification Search
CPC . H05B 33/0815; H05B 41/36; H02M 3/156; H02M 1/4225; Y02B 70/126; H03M 2201/516
See application file for complete search history.

(56) References Cited

U.S. PATENT DOCUMENTS

| | | | |
|---|---|---|---|
| 7,960,870 B2* | 6/2011 | Besser | G05F 1/67 307/151 |
| 8,031,494 B2* | 10/2011 | Brkovic | 363/49 |
| 8,289,731 B2* | 10/2012 | Spiridon et al. | 363/21.12 |
| 8,971,060 B2* | 3/2015 | Wu et al. | 363/21.12 |
| 8,981,673 B2* | 3/2015 | Athalye | 315/307 |
| 2007/0024259 A1 | 2/2007 | Ball et al. | |
| 2007/0146020 A1* | 6/2007 | Williams | 327/110 |
| 2009/0102547 A1* | 4/2009 | Dake et al. | 327/574 |
| 2011/0019446 A1* | 1/2011 | Wu | H02M 3/33523 363/79 |
| 2011/0149614 A1 | 6/2011 | Stracquadaini | |
| 2013/0038242 A1* | 2/2013 | Athalye | 315/297 |
| 2013/0077369 A1* | 3/2013 | Swaminathan | H02M 7/2176 363/126 |
| 2013/0234621 A1* | 9/2013 | Athalye | 315/307 |
| 2014/0119078 A1* | 5/2014 | Walters et al. | 363/89 |
| 2015/0002109 A1 | 1/2015 | Bianco | |

OTHER PUBLICATIONS

"High-Speed, Pulse Width Modulator", 2008 Microchip Technology Inc., DS22063B, MCP1631/HV/MCP1631V/VHV, 34 pages.
"Flyback Converters with the L6561 PFC Controller", Jan. 2003, Application Note AN1060, 11 pages.

(Continued)

Primary Examiner — Vibol Tan
(74) Attorney, Agent, or Firm — Brinks Gilson & Lione

(57) ABSTRACT

A switched mode power supply may include circuitry configured to output a bias signal that turns off and on switching circuitry of the switched mode power supply. The circuitry may wait for a first time period determined by the bias signal, and output the bias signal to turn off the switching circuitry when the time period expires. In addition or alternatively, the circuitry may begin waiting for a second time period when the bias signal turns off the switching circuitry. The circuitry may turn on the switching circuitry either when energy in inductive storage circuitry is depleted or when the second time period expires.

30 Claims, 16 Drawing Sheets

(56) References Cited

OTHER PUBLICATIONS

"*18 W Single-Stage Offline LED Driver Based on the L6562A*" (European version), Feb. 2011, Doc ID 18470 Rev 1, STEVAL-ILL027V2, 4 pages.

"*TM Sepic Converter in PFC Pre-Regulator*", Mar. 2007, Application Note AN2435, 25 pages.

"*Floating Switch for Offline AC Linear Direct Drive of LEDS with Low Ripple Current*", Texas Instruments, SLUSBQ6A—Oct. 2013—Revised Feb. 2014, 23 pages.

* cited by examiner

ON-TIME CONTROL FOR SWITCHED MODE POWER SUPPLIES

TECHNICAL FIELD

The present disclosure relates generally to switched mode power supplies, and more particularly to circuits that control when a controller circuit turns on and turns off switching circuitry of the switched mode power supply.

BACKGROUND

Switched mode power supplies may receive an alternating current (AC) input signal, rectify the AC input signal, and convert the rectified AC signal to a direct current (DC) output signal. Typically, the AC input signal may be supplied by a utility line of a power grid, and a power converter may receive the AC input signal by being connected to the utility line, such as by having its input connected a wall outlet. Power supplied from the power grid may be utilized most efficiently by the power converter when voltage and current components of the AC input signal are communicated in phase with each other. Conversely, power supplied from the power grid may be wasted when the AC input voltage and the AC input current are out of phase. Power converters may include power factor correction (PFC) circuitry that shapes the AC input current to be in phase with the AC input voltage in order to maximize power efficiency.

DETAILED DESCRIPTION

The present disclosure describes example switched mode power supplies that turn on and off switching circuitry over multiple switching cycles to drive an output load. The example switched mode power supplies may include circuitry that is configured to wait for one or more time periods before outputting a bias signal to turn on and/or turn off the switching circuitry. The time periods for which the circuitry waits may depend on a bias voltage signal that turns on and off the switching circuitry. In addition, the time periods for which the circuitry waits may be constant over multiple switching cycles.

Figure 1:
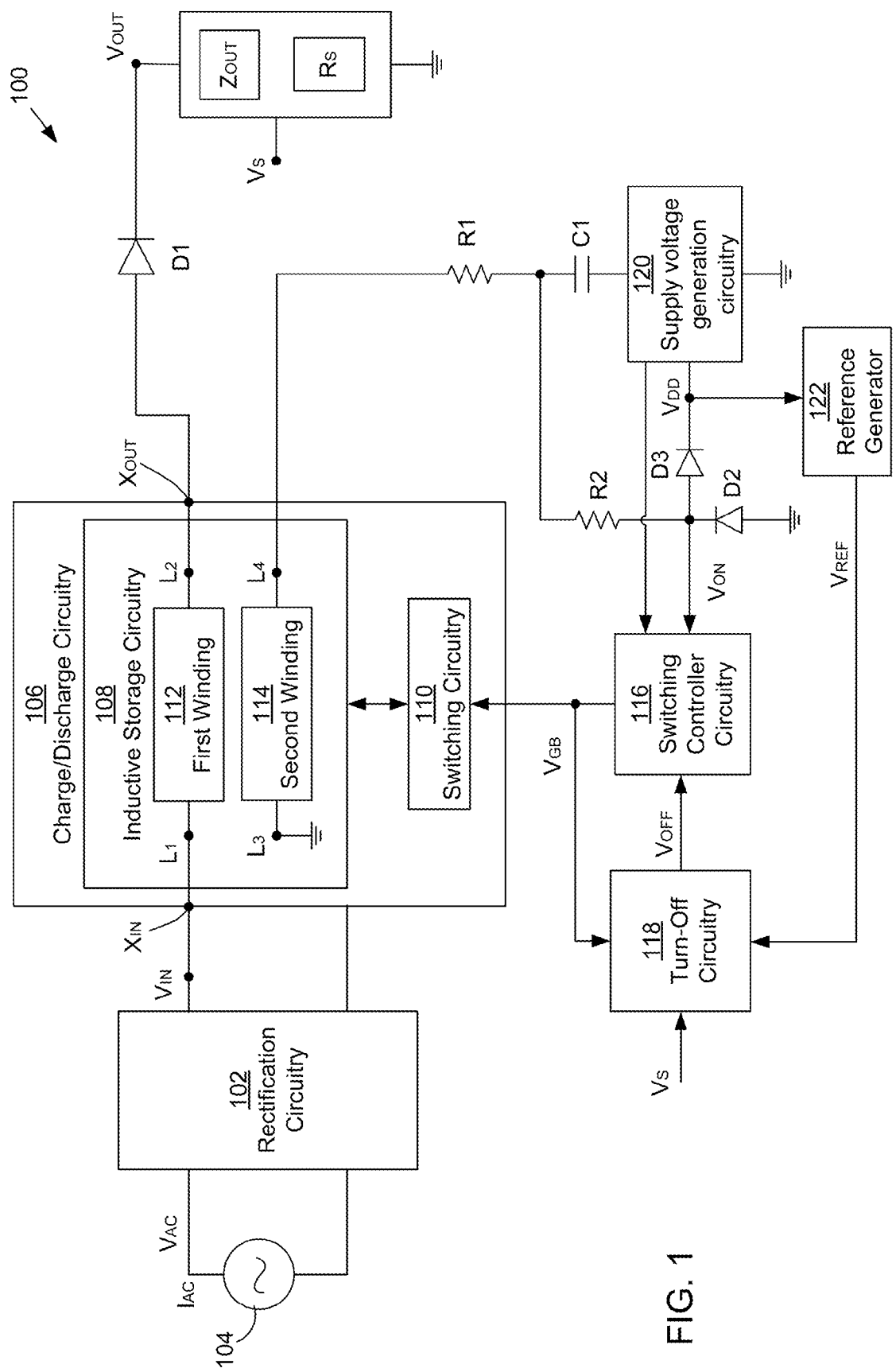
FIG. 1 shows a schematic diagram of an example switched mode power supply.

FIG. 1 shows a schematic of a switched mode power supply 100 that may be configured to convert an input voltage $V_{IN}$ to an output voltage $V_{OUT}$. The output voltage may be a direct current (DC) output voltage that is generated across an output load $Z_{OUT}$. The input voltage $V_{IN}$ may be a DC voltage or a rectified alternating current (AC) voltage. The switched mode power supply 100 may include or be in communication with rectification circuitry 100 that may be configured to rectify an AC voltage $V_{AC}$ in order to generate the rectified AC voltage. The AC voltage $V_{AC}$ may be generated and/or received from an AC power supply 104, such as a wall outlet in communication with a utility line or a power grid. Example AC voltages may include 230 volts (V) at 50 Hertz (Hz) or 120 V at 60 Hz.

The switched mode power supply 100 may include charge/discharge circuitry 106 coupled to the input voltage $V_{IN}$ and the output voltage $V_{OUT}$. The charge/discharge circuitry 106 may include inductive storage circuitry 108 and switching circuitry 110. The inductive storage circuitry 108 may be configured to store and discharge energy. The stored energy may be discharged as electrical current. Charging and discharging of the inductive storage circuitry 108 may be controlled by switching of the switching circuitry 110.

The inductive storage circuitry 108 and the switching circuitry 110 of the charge/discharge circuitry 106 may be configured and/or coupled to each other in different ways, depending on the different topologies of the switched mode power supply 100, examples of which are shown and described in further detail below with respect to FIGS. 11-14. In general, the charge/discharge circuitry 106 may have an input terminal $X_{IN}$ coupled to the input voltage $V_{IN}$ and an output terminal $X_{OUT}$ coupled to the output voltage $V_{OUT}$. A diode D1 may couple the output terminal $X_{OUT}$ with the output voltage $V_{OUT}$ generated across the output load $Z_{OUT}$. When the diode D1 is forward biased, current discharged from the inductive storage circuitry 108 via the output terminal $X_{OUT}$ may pass through the diode D1 to drive the output load $Z_{OUT}$.

The inductive storage circuitry 108 may include a magnetic element or component, such as an inductor or a transformer, that is configured to store and discharge energy. The magnetic element may include at least a first winding 112 and a second winding 114. The first and second windings 112, 114 may be parts or components of the same magnetic core. The first winding 112 may include a first end $L_1$ and a second end $L_2$. The first end $L_1$ may be coupled to the input terminal $X_{IN}$ of the charge/discharge circuitry 106, and the second end $L_2$ may be coupled to the output terminal $X_{OUT}$. The second winding 114 may include a first end $L_3$ and a second end $L_4$.

A voltage $V_{43}$ generated across the second winding 114 from the second end $L_4$ to the first end $L_3$ may be proportional to a voltage $V_{21}$ generated across the first winding 112 from the second end $L_2$ to the first end $L_1$. The proportionality of the voltage $V_{43}$ and $V_{21}$ may depend on a turns-ration between the first and second windings 112, 114. For some example configurations, as shown in FIG. 1, the first end $L_3$ of the second winding 114 may be connected or tied to ground, and so the voltage $V_4$ generated at the second end $L_4$ with respect to ground may be proportional to the voltage $V_{21}$ generated across the first winding 112.

The switching circuitry 110 may include one or more switches, each of which may be configured to switch between an on state (or a closed state) and an off state (or an open state). Example switches may include transistors, such as field-effect transistors (FETs) (including metal-oxide-semiconductor FETs (MOSFETs)) or bipolar junction transistors (BJTs), although other types of switches may be used. The switching circuitry 110 may be configured to control charging and discharging of the inductive storage circuitry 108 in that when the switching circuitry 110 is turned on, the voltage $V_2$ generated at the second end $L_2$ may be pulled to ground, and the inductive storage circuitry 108 may be configured to store energy. Alternatively, when the switching circuitry is turned off, the second end $L_2$ may be based on the output voltage $V_{OUT}$, and the inductive storage circuitry 108 may be configured to discharge the stored energy.

The switched mode power supply 100 may include and/or be in communication with circuitry used to turn the switching circuitry 110 on and off. The circuitry may include switching controller circuitry 116 that is configured to control switching of the switching circuitry 110 between the on state and the off state. To control switching of the switching circuitry 110, the switching controller circuitry 116 may be configured to generate a bias voltage signal $V_{GB}$ at a first voltage level that turns on the switching circuitry 110 and/or maintains the switching circuitry 110 in the on state, and at a second voltage level that turns off the switching circuitry 110 and/or maintains the switching circuitry 110 in the off state. The switching controller circuitry 116 may generate the bias signal $V_{GB}$ as a pulse-width modulated (PWM) signal in which the bias signal $V_{GB}$ may be at the first voltage level during a first time period of a switching cycle, and at the second voltage level during a second time period of the switching cycle.

The switching circuitry 110 may switch on and off during the first and second time periods of the switching cycle that the bias signal $V_{GB}$ is at the first and second voltage levels, respectively. The first time period during which the switching circuitry 110 is turned on and the inductive storage circuitry 108 is charging may be referred to as the "on time" of the switching cycle. Similarly, the second time period during which the switching circuitry 110 is turned off and the inductive storage circuitry 108 is discharging may be referred to as the "off time" of the switching cycle.

The switching controller circuitry 116 may be configured to receive an on signal $V_{ON}$ that may cause the switching controller circuitry 116 to generate the bias signal $V_{GB}$ at the first voltage level to turn on the switching circuitry. In the example configuration shown in FIG. 1, the on signal $V_{ON}$ may be generated from the voltage $V_4$ generated at the second end $L_4$ of the second winding 114. When the switching circuitry 110 is turned on, the voltage $V_2$ generated at the second end $L_2$ may be pulled to ground, and so the voltage $V_4$ at the second end $L_4$ of the second winding 114 may be largely proportional in magnitude to the input voltage $V_{IN}$ but with a negative polarity. Alternatively, when the switching circuitry 110 is turned off, the voltage $V_2$ at second end $L_2$ may be based on the output voltage $V_{OUT}$, and so the voltage $V_4$ at the second end $L_4$ of the second winding 114 may be largely proportional to the voltage difference between the output voltage $V_{OUT}$ and the input voltage $V_{IN}$, which may be a positive voltage. In general, the voltage $V_4$ at the second end $L_4$ may be at a higher voltage level when the switching circuitry 110 is turned off than when the switching circuitry 110 is turned on. However, when the switching circuitry 110 is turned off but there is no more energy stored in the inductive storage circuitry 108 to be discharged, the voltage $V_4$ at the second end $L_4$ of the second winding 114 may fall back down to the lower level. When the voltage $V_4$ transitions back down to the lower level, the on signal $V_{ON}$ being generated from the voltage $V_4$ may correspondingly transition from a high level to a low level. The switching controller circuitry 116 may be configured to detect the high-to-low (or falling edge) transition of the on signal $V_{ON}$, and in response, begin generating the bias signal $V_{GB}$ at the first voltage level to turn on the switching circuitry 110.

For some example configurations, to generate the on signal $V_{ON}$ based on the voltage $V_4$, resistance circuitry, such as resistors R1 and R2, may be included to reduce or step down the voltage $V_4$. In addition or alternatively, one or more coupling capacitors, such as capacitor C1, may be included to reduce the voltage swing of the voltage $V_4$ as the switching circuitry 110 switches between the on and off states. Also, rectification circuitry may be included to reduce or minimize the negative polarity of the on signal $V_{ON}$ when the switching circuitry 110 is turned on. In the example configuration shown in FIG. 1, the rectification circuitry may include a rectification diode D2, which may prevent the on signal $V_{ON}$ from falling below a diode voltage drop below ground. Further, depending on the configuration of the switching controller circuitry 116, clamping circuitry, such as a clamping diode D3, may be included to prevent the on signal $V_{ON}$ from exceeding a predetermined clamp voltage.

The circuitry of switched mode power supply 100 used to turn the switching circuitry on and off may further include turn-off circuitry 118 that is configured to output an off signal $V_{OFF}$ to the switching controller circuitry 116 that causes the switching controller circuitry 116 to output the bias signal $V_{GB}$ at the second voltage level to turn off the switching circuitry 110. For some example configurations, the turn-off circuitry 118 may be configured to transition a voltage level of the off signal $V_{OFF}$ from a first level to a second level to cause the switching controller circuitry 116 to output the bias signal $V_{GB}$ at the second voltage level to turn off the switching controller circuitry 116. The transition may be a rising-edge transition where the first level is lower than the second level, or a falling-edge transition where the first level is higher than the second level. The switching controller circuitry 116 may be configured to detect the transition, and in response, output the bias signal $V_{GB}$ at the second voltage level to turn off the switching circuitry 110. Alternatively, when the turn-off circuitry 118 maintains the level of the off signal $V_{OFF}$ or transitions the level from the second level to the first level, the switching controller circuitry 116 may maintain the voltage level of the bias signal $V_{GB}$ at its current level.

The turn-off circuitry 118 may be configured to wait for a time period before outputting the off signal $V_{OFF}$ to cause the switching controller circuitry 116 to turn off the switching circuitry 110. The time period may be any amount of elapsed time, including a predetermined time period, a time period determined or calculated in real time, a static time period over multiple switching cycles, a dynamic time period or multiple time switching cycles, an amount of time based on feedback control, a time period determined by circuit components of the switched power supply 100, or combinations thereof, as non-limiting examples. As shown in FIG. 1, the turn-off circuitry 118 may have an input that is coupled to the output of the switching controller circuitry 116 and configured to receive the bias signal $V_{GB}$. The turn-off circuitry 118 may be configured to detect when the bias signal $V_{GB}$ transitions from the second voltage level to the first voltage level to turn on the switching circuitry 110. Upon detection of the transition, the turn-off circuitry 118 may be configured to begin waiting for the time period. When the time period expires, the turn-off circuitry 118 may be configured to generate and output the off signal $V_{OFF}$ to the switching controller circuitry 116 such that the switching controller circuitry 116 outputs the bias signal $V_{GB}$ at the second voltage level to turn off the switching circuitry 110.

Additionally, the time period for which the turn-off circuitry 118 waits may depend on the bias signal $V_{GB}$ at the first voltage level. As previously described, the turn-off circuitry 118 may begin waiting for the time period when the bias signal $V_{GB}$ transitions from the second level to the first level. Thereafter, the turn-off circuitry 118 may continue to receive the bias signal $V_{GB}$ at the first level. As described in further detail below, the turn-off circuitry 118 may use the bias signal $V_{GB}$ at the first level to generate an internal signal that determines when the time period expires. For example, using the bias signal $V_{GB}$ at the first level, the turn-off circuitry 118 may generate the internal signal at a level that changes from a first level to a second, threshold level over a period of time. That period of time may be the time period for which the turn-off circuitry waits before triggering the switching controller circuitry 116 to turn off the switching circuitry 110.

The time period that the turn-off circuitry 118 waits while the switching circuitry 110 is turned on may be constant over multiple switching cycles, which in turn may cause the switching circuitry 110 to be turned on for the same amount of time over the multiple switching cycles. Where the first level of the bias signal $V_{GB}$ is constant over multiple switching cycles, the time that the internal signal generated by the turn-off circuitry 118 to reach the threshold level may be the same, causing the time period to be constant over the multiple switching cycles. The switching circuitry 110 may be referred to as operating in a constant on time mode when it is turned on for the same amount of time over the multiple switching cycles.

When the switching circuitry 110 operates in the constant on time mode, the switched mode power supply 100 may be configured to deliver the AC voltage component $V_{AC}$ and the AC current component $I_{AC}$ in phase or substantially in phase with each other. As a result, the switched mode power supply 100 may maximize or optimize its power factor and utilize AC power supplied by the AC power supply 104 with maximum or optimum efficiency.

For some example configurations, the turn-off circuitry 118 may be configured to determine when the time period expires by generating an internal ramp signal $V_{RAMP}$ and comparing a voltage level of the ramp signal $V_{RAMP}$ with a threshold voltage $V_{COMP}$ (the ramp signal $V_{RAMP}$ and the threshold voltage $V_{COMP}$ are not shown in FIG. 1). The ramp signal $V_{RAMP}$ may be generally any signal that changes its voltage level, either by increasing (ramping up) or decreasing (ramping down) including either linearly or non-linearly, from a first ramp level toward the threshold voltage $V_{COMP}$ over a period of time. As long as the voltage level of the ramp signal $V_{RAMP}$ has not yet reached the threshold voltage $V_{COMP}$, the turn-off circuitry 118 may determine that the time period has not expired and/or may output the off signal $V_{OFF}$ at the first level. In turn, the switching controller circuitry 116 may maintain the voltage level of the bias signal $V_{GB}$ at the first voltage level to keep the switching circuitry 110 turned on. Alternatively, when the voltage level of the ramp signal $V_{RAMP}$ reaches or exceeds the threshold voltage $V_{COMP}$, the turn-off circuitry 118 may transition the off signal $V_{OFF}$ from the first level to the second level. In turn, the switching controller circuitry 116 may detect the transition of the off signal $V_{OFF}$ from the first level to the second level and in response, generate the bias signal $V_{GB}$ at the second voltage level to turn off the switching circuitry 110.

The threshold voltage $V_{COMP}$ may be generated based on a reference voltage $V_{REF}$. The reference voltage $V_{REF}$ may be generated with a reference voltage generator 122, such as a voltage regulator or other similar voltage generating circuit. For some example configurations, the threshold voltage $V_{COMP}$ is the reference voltage $V_{REF}$. For other example configurations, the threshold voltage $V_{COMP}$ may be based on a difference between the reference voltage $V_{REF}$ and a sense voltage $V_S$ generated by output circuitry 124. As shown in FIG. 1, the output circuitry 124 may include the output load $Z_{OUT}$ and sense resistor circuitry $R_S$. The sense resistor circuitry $R_S$ may include a single resistor, a plurality of resistors connected in series, parallel, or combinations thereof, or other similar circuitry configured to provide a resistance. The sense resistor circuitry $R_S$ may be configured in series or in parallel with the output load $Z_{OUT}$, which may depend on whether the switched mode power supply 100 is a constant current power supply or a constant voltage power supply.

Figure 1B:
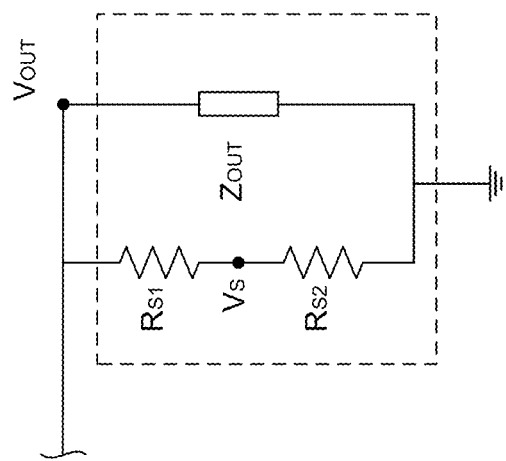
FIG. 1B shows a schematic diagram of another example configuration of the output circuitry of the switched mode power supply of FIG. 1.
Figure 1A:
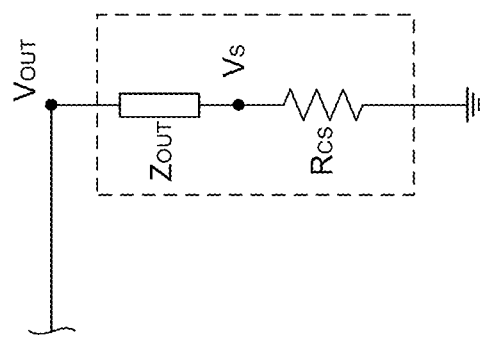
FIG. 1A shows a schematic diagram of an example configuration of output circuitry of the switched mode power supply of FIG. 1.

FIGS. 1A and 1B show different configurations of the output load $Z_{OUT}$ and the sense resistor circuitry $R_S$. FIG. 1A shows the sense resistor circuitry $R_S$ connected in series with the output load $Z_{OUT}$. The sense voltage $V_S$ may be generated in between the sense resistor circuitry $R_S$ and may be indicative of the current drawn through the output load $Z_{OUT}$. FIG. 1B shows the sense resistor circuitry $R_S$ connected in parallel with the output load $Z_{OUT}$. The sense resistor circuitry $R_S$ may include first sense resistor circuitry $R_{S1}$ connected in series with second sense resistor circuitry $R_{S2}$. The sense voltage $V_S$ may be generated in between the first and second sense resistors $R_{S1}$, $R_{S2}$ and indicative of the output voltage $V_{OUT}$. In particular, the first and second sense resistor circuitries $R_{S1}$, $R_{S2}$ may provide a voltage-division network such that the sense voltage $V_S$ is a voltage-divided or stepped-down version of the output voltage $V_{OUT}$ as determined by the resistance values of the first and second sense resistor circuitries $R_{S1}$, $R_{S2}$.

Referring back to FIG. 1, the sense voltage $V_S$ may be supplied to the turn-off circuitry 118. The turn-off circuitry 118 may be configured to determine a difference between the reference voltage $V_{REF}$ with the sense voltage $V_S$, and the threshold voltage $V_{COMP}$ may be based on and/or indicative of the difference.

Additionally, so that the switching circuitry 110 operates in the constant on-time mode, the turn-off circuitry 118 may be configured to generate the ramp signal $V_{RAMP}$ such that the time that the ramp signal $V_{RAMP}$ takes to change from the first ramp level to the threshold voltage $V_{COMP}$ may be the same over multiple switching cycles. For some example configurations, in order to do so, the turn-off circuitry 118 may be configured to generate the ramp signal $V_{RAMP}$ in accordance with a time constant, such as a resistor-capacitor (RC) time constant, where the voltage level of the ramp signal $V_{RAMP}$ may increase at a constant rate in accordance with the time constant.

The on time of the switching cycle may be based on the time constant, the first voltage level of the bias signal $V_{GB}$ that turns on the switching circuitry 110, and the threshold voltage (e.g., the difference between the reference voltage $V_{REF}$ and the sense voltage $V_S$). Because the time constant, the first voltage level of the bias signal $V_{GB}$, and the reference voltage $V_{REF}$ may be constant values, then as long as the sense voltage $V_S$ is constant (i.e., the current drawn through the output load $Z_{OUT}$ or the output voltage $V_{OUT}$ generated across the output load $Z_{OUT}$ is constant), the switching controller circuitry 116 may be configured to output the bias signal $V_{GB}$ such that switching circuitry 110 operates in the constant on time mode.

The switched mode power supply 100 may further include supply voltage generation circuitry 120 configured to generate a DC supply voltage $V_{DD}$. As shown in FIG. 1, the supply voltage generation circuitry 120 may be coupled to the coupling capacitor C1 and generate the supply voltage $V_{DD}$ based on the voltage $V_4$ generated at the second end $L_4$ of the second winding 114. The supply voltage $V_{DD}$ may be used as a DC voltage in the switched mode power supply 100, such as for the predetermined clamp voltage coupled to diode D3 and as a power supply voltage for the reference generator 122 and for various electronic components in the switching controller circuitry 116. In alternative example configurations, the supply voltage generation circuitry 120 may not be included and the supply voltage $V_{DD}$ may be supplied from a source external the switched mode power supply 100. In still other alternative example configurations, the supply voltage generation circuitry 120 may be configured to generate the supply voltage $V_{DD}$ from a point in the switched mode power supply 100 other than the second winding 114. Various configurations for generating a DC voltage for use in the switched mode power supply 100 may be possible.

The circuitry of the switched mode power supply 100 used to generate and output the bias signal $V_{GB}$, including the switching controller circuitry 116, the turn-off circuitry 118, the supply voltage generation circuitry 120, the reference generator 122, resistors R1, R2, diodes D2, D3, and capacitor C1, may be implemented in hardware or a combination of hardware and software in various ways. For example, the circuitry may include analog components, digital components, or combinations thereof. In addition or alternatively, one, more than one, or all the circuitries may be implemented as a single integrated circuit (IC) or a plurality of integrated circuits, such as one or more field programmable gate arrays (FPGA), one or more application specific integrated circuits (ASIC), or combinations thereof. In addition or alternatively, the circuitry may include a hardware processor configured to execute software or firmware and/or digital or analog circuit components such as flip-flops, logic circuits, comparators, operational amplifiers and edge detectors as examples to perform one or more of the functions or operations of the switching controller circuitry 116 and/or the turn-off circuitry 118.

Figure 2:
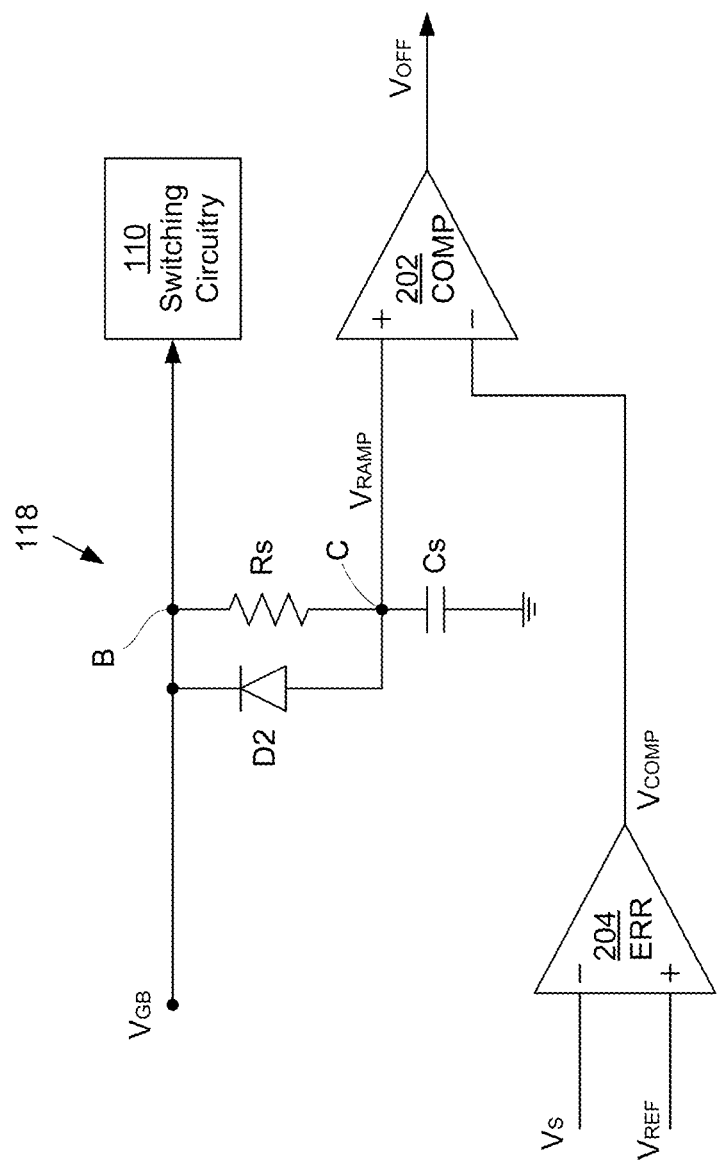
FIG. 2 shows a schematic diagram of example turn-off circuitry.

FIG. 2 shows a schematic diagram of an example circuit implementation of the turn-off circuitry 118. The turn-off circuitry 118 may include ramp generation circuitry configured to generate a ramp signal $V_{RAMP}$ having a sawtooth waveform that increases or ramps up from a first ramp level in accordance with a time constant. The ramp generation circuitry may include a resistor-capacitor circuit comprising a resistor component $R_R$ and a capacitor component $C_R$. The resistor component $R_R$ may be a single resistor, a plurality of resistors connected in series, parallel, or combinations thereof, or other similar resistive circuits configured to provide a resistance. Similarly, the capacitor component $C_R$ may be a single capacitor, a plurality of capacitors connected in series, parallel, or combinations thereof, or other similar capacitive circuits configured to provide a capacitance. For the example circuit implementation shown in FIG. 2, the resistor component $R_R$ has a first end coupled to node B where the bias signal $V_{GB}$ is generated, and the capacitor component $C_R$ has a first end coupled to ground. In addition, second ends of each of the resistor component $R_R$ and the capacitor component $R_R$ may be coupled together at node C, where the ramp signal $V_{RAMP}$ may be generated. When the voltage level of the ramp signal $V_{RAMP}$ increases, the increase may be in accordance with a resistor-capacitor (RC) time constant as determined by the resistance provided by the resistor component $R_R$ and the capacitance provided by the capacitor component $C_R$.

The example implementation of the turn-off circuitry 118 may also include a diode $D_R$ having a cathode end coupled to node B and an anode end coupled to node C. The diode $D_R$ may serve as a discharge path for the capacitor when the voltage level of the bias signal $V_{GB}$ is pulled down to the logic low level.

For the example configuration of the turn-off circuitry 118 shown in FIG. 2, the first voltage level of the bias signal $V_{GB}$ that turns on the switching circuitry 110 may be a high level and the second voltage level of the bias signal $V_{GB}$ that turns off the switching circuitry 110 may be a low level. When the voltage level of the bias signal $V_{GB}$ transitions to the first, high level to turn on the switching circuitry 110, the ramp generation circuitry may generate a current based on the bias signal $V_{GB}$ at the first, high level and the RC time constant. The current may flow through the resistor component $R_R$ to the capacitor component $C_R$, and the capacitor component $C_R$ may begin to charge in response to the current. In turn, the voltage level of the ramp signal $V_{RAMP}$ generated across the capacitor component $C_R$ at node C may begin to increase from the first ramp level at a rate determined by the RC time constant. Accordingly, the voltage level of the ramp signal $V_{RAMP}$ as a function of time may depend on the bias signal $V_{GB}$ at the first, high level, and the RC time constant. When the voltage level of the bias signal $V_{GB}$ transitions to the low level, current may no longer flow through the resistor component $R_R$, and the capacitor component $C_R$ may no longer charge. Charge stored in the capacitor component $C_R$ may discharge through the diode $D_R$ and to the switching controller circuitry 116, where it may discharge to ground as described in further detail with reference to FIG. 4.

The example implementation of the turn-off circuitry 118 may also include a comparator circuit 202 that is configured to compare the voltage level of the ramp signal $V_{RAMP}$ with a threshold voltage $V_{COMP}$ and output the off signal $V_{OFF}$ at the first level or the second level based on the comparison. For the example implementation shown in FIG. 2, the first level may be lower than the second level, and a rising-edge transition from the first level to the second level may trigger the switching controller circuitry 116 to output the bias signal $V_{GB}$ at the second voltage level to turn off the switching circuitry. The comparator circuit 202 may receive the ramp signal $V_{RAMP}$ at a first, positive input and a threshold voltage $V_{COMP}$ at a second, negative input. When the voltage level of the ramp signal $V_{RAMP}$ is below the voltage level of the threshold voltage $V_{COMP}$, the comparator circuit 202 may generate and output the off signal $V_{OFF}$ at the first, lower level. Alternatively, when the voltage level of the ramp signal $V_{RAMP}$ meets or exceeds the threshold voltage $V_{COMP}$, the comparator circuit 202 may generate and output the off signal $V_{OFF}$ at the second, higher level.

The example implementation of the turn-off circuitry 118 may further include an error amplifier (ERR) 204 that is configured to receive the reference voltage $V_{REF}$ at a first, positive input and the sense voltage $V_S$ at a second, negative input and generate the threshold voltage $V_{COMP}$. The level of the threshold voltage $V_{COMP}$ may be indicative of the difference between the reference and sense voltages $V_{REF}$, $V_S$. In other example configurations of the turn-off circuitry 118, the sense voltage $V_S$ and the error amplifier 204 may not be used and the reference voltage $V_{REF}$ may be input directly into the second, negative input terminal of the comparator circuit 202.

The resistor component $R_R$ and the capacitor component $C_R$ of the ramp generation circuitry, along with the first, high level of the bias signal $V_{GB}$ and the level of the reference voltage $V_{REF}$ may all be constant values. As such, as long as the sense voltage $V_S$ is constant over multiple switching cycles, the amount of time that the voltage of the ramp signal $V_{RAMP}$ generated at node C takes to reach the threshold voltage $V_{COMP}$ may correspondingly be constant over the multiple switching cycles. Accordingly, the time period that the turn-off circuitry 118 waits before triggering the switching controller circuitry 116 to turn off the switching circuitry 110 may be constant over the multiple switching cycles.

The use of the bias signal $V_{GB}$ and ramp generation circuitry coupled to the output of the controller circuitry 116 to turn off the switching circuitry may be for any range of switching frequencies at which the bias signal $V_{GB}$ is configured to switch the switching circuitry 110 on and off. An example implementation may be where the switching frequency exceeds the operating frequency at which the switching controller circuitry's 116 own internal circuitry that detects when to turn off the switching circuitry 110 is capable of operating. Example switching frequencies may be around one gigahertz (1 GHz) or greater.

Figure 3:
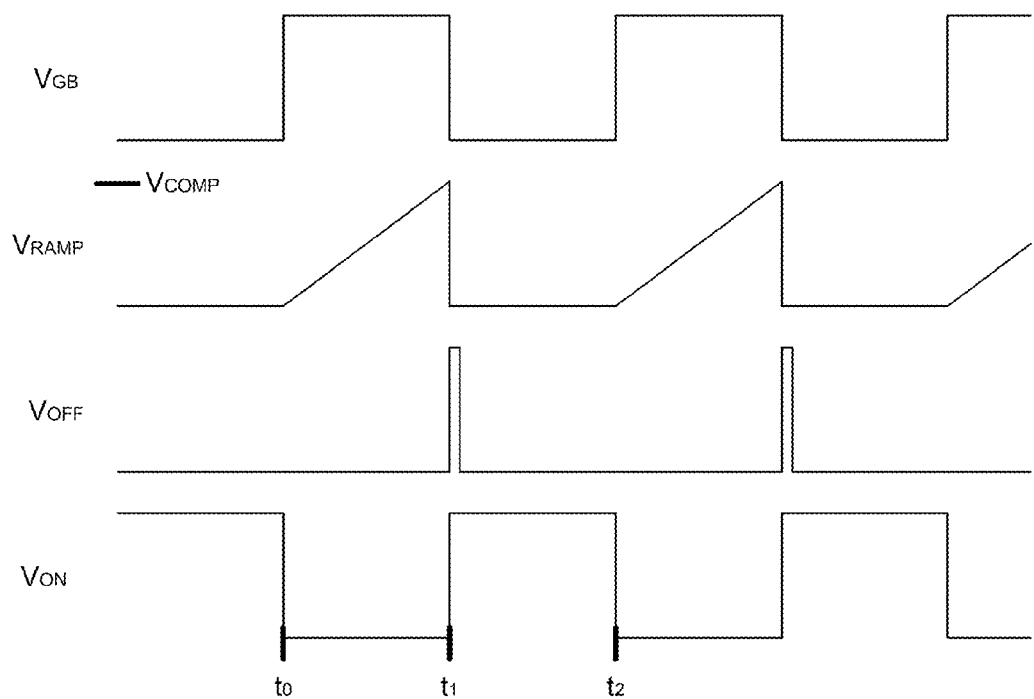
FIG. 3 shows a timing diagram of signals being generated in the example switched mode power supply of FIG. 1.

FIG. 3 shows a timing diagram of the bias signal $V_{GB}$, the ramp signal $V_{RAMP}$, the off signal $V_{OFF}$, and the on signal $V_{ON}$ being generated in the switched mode power supply 100 using the example implementation of the turn-off circuitry 118 shown in FIG. 2. For simplicity, any delays between the signals and rise or fall times associated with the signals are not shown. The timing diagram begins at an initial time $t_0$ when the on signal $V_{ON}$ has fallen from a high level to a low level due to the inductive storage circuitry 108 having discharged the stored energy. The switching controller circuitry 116 may detect the high-to-low transition at the initial time $t_0$ and generate the bias signal $V_{GB}$ at the first voltage level that turns on the switching circuitry 110. As shown in FIG. 3, the first voltage level that turns on the switching circuitry 110 may be higher than the second voltage level that turns off the switching circuitry 110, although the voltage levels may be reversed in alternative configurations depending on the types of switches used for the switching circuitry 110. In response to the bias signal $V_{GB}$ transitioning to the first voltage level, the ramp signal $V_{RAMP}$ may begin increasing from the first ramp level. The ramp signal $V_{RAMP}$ may increase at a rate according to a time constant as previously described. Additionally, the off signal $V_{OFF}$ may be at a low level since the voltage level of the ramp signal $V_{RAMP}$ is below the threshold voltage $V_{COMP}$.

At a subsequent time $t_1$, the voltage level of the ramp signal $V_{RAMP}$ may reach the threshold voltage $V_{COMP}$, which may be detected by the turn-off circuitry 118. Upon detection, the turn-off circuitry 118 may transition the level of the off signal $V_{OFF}$ from the low level to the high level. The switching controller circuitry 116 may detect the rising-edge transition and in response, transition the level of the bias signal $V_{GB}$ from the first voltage level to the second voltage level, which may turn off the switching circuitry 110. In response to the switching circuitry 110 turning off, the ramp signal $V_{RAMP}$ may transition back down to the first ramp level due to charge stored in the capacitor component $C_R$ discharging. In turn, the level of the ramp signal $V_{RAMP}$ may fall below the comparison voltage $V_{COMP}$, which may cause the off voltage $V_{OFF}$ to fall back to a low level. As previously described, the high-to-low transition may have no effect on the level of the bias signal $V_{GB}$, which may be maintained at the low level, keeping the switching circuitry 110 turned off.

Additionally, in response to the switching circuitry 110 turning off, the voltage $V_4$ generated at the second end $L_4$ of the second winding 114 may increase to a high (positive) level, causing the on signal $V_{ON}$ to correspondingly transition to a high level. The bias signal $V_{GB}$, the ramp signal $V_{RAMP}$, and the start signal $V_{START}$ may be maintained at their respective levels until a subsequent time $t_2$ when the energy in the inductive storage circuitry 108 is depleted, at which time the level of the on signal $V_{ON}$ may transition back low, and the switching cycle may be repeated. When the beginning of a switching cycle is considered the time at which the bias signal $V_{GB}$ transitions to the first voltage level to turn on the switching circuitry 110, the falling-edge transition on the on signal $V_{ON}$ may be considered the transition that starts a next switching cycle.

Figure 4:
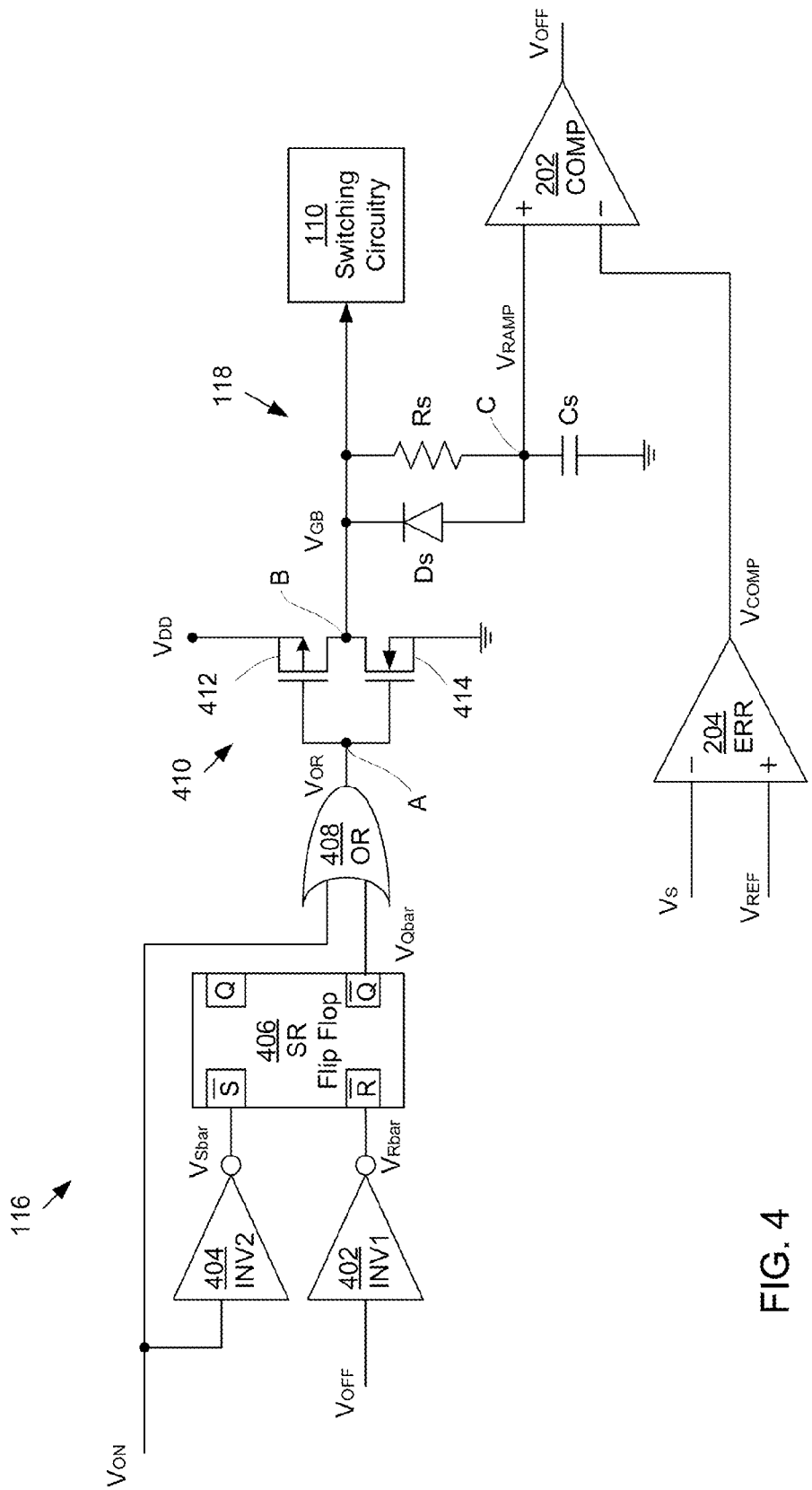
FIG. 4 shows schematic diagram of example switching controller circuitry coupled to the example turn-off circuitry of FIG. 2.

FIG. 4 shows a schematic diagram of an example circuit implementation of the switching controller circuitry 116 in combination with the example implementation of the turn-off circuitry 118 shown in FIG. 2. The comparator circuit 202 may output the off signal $V_{OFF}$ to a first inverter circuit (INV1) 402, which may be configured to invert the off signal $V_{OFF}$ to generate an output voltage $V_{Rbar}$. That is, when the off signal $V_{OFF}$ is at a low level, the first inverter circuit 402 may generate the output voltage $V_{Rbar}$ at a high level, which may correspond to a logic high. Alternatively, when the off signal $V_{OFF}$ is at a high level, the output voltage $V_{Rbar}$ generated by the first inverter circuit 402 may be at a low level corresponding to a logic low. The switching controller circuitry 116 may further include a second inverter circuitry (INV2) 404 that is configured to receive the on signal $V_{ON}$ and invert the voltage level of the on signal $V_{ON}$ to generate an output $V_{Sbar}$ having corresponding logic high and logic low levels.

The switching controller circuitry 116 may further include a set-reset (SR) flip-flop circuit 406 that includes a $S_{bar}$ input configured to receive the output $V_{Sbar}$ from the second inverter circuit 404 and a $R_{bar}$ configured to receive the output $V_{Rbar}$ from the first inverter circuit 402. The switching controller circuitry 116 may further include a logic OR gate circuit (OR) 408 configured to perform OR logic operations. The logic OR gate circuit 408 may receive as a first input an output $V_{Qbar}$ from a $Q_{bar}$ output of the SR flip-flop circuit 406 and may receive as a second input the on signal $V_{ON}$. The logic OR gate circuit 408 may perform a logic OR operation on the output $V_{Qbar}$ and the on signal $V_{ON}$ to generate an output $V_{OR}$.

The switching controller circuitry 116 may further include a push-pull circuit 410 (also referred to a totem pole circuit). For the example configuration shown in FIG. 4, the push-pull circuit 410 may include a first transistor 412, which may be a p-channel MOSFET, and a second transistor 414, which may be a n-channel MOSFET. Gate terminals of each of the first transistor 412 and the second transistor 414 may be connected or tied together and to the output of the logic OR gate circuit 408 at a node A. A source terminal of the second transistor 414 may be connected or tied to ground, and a source terminal of the first transistor 412 may be coupled to the supply voltage $V_{DD}$. In alternative example configurations, the source terminal of the first transistor 412 may be coupled to a voltage supply other than the supply voltage $V_{DD}$. In addition, drain terminals of each of the first transistor 412 and the second transistor 414 may be connected or tied together at node B, which may correspond to node B in FIG. 2. The voltage generated at node B may be the output of the switching controller circuitry 116 and the bias signal $V_{GB}$, which may be applied to the switching circuitry 110.

In operation, when the output of the logic OR gate circuit 408 is at a logic low level, the first transistor 412 may be turned on and the second transistor 414 may be turned off, which may pull the voltage level of the bias signal $V_{GB}$ at node B to a high level (e.g., at or near $V_{DD}$). Alternatively, when the output of the logic OR gate circuit 408 is at a logic high level, the first transistor 412 may be turned off and the second transistor 414 may be turned on, which may pull down the voltage level of the bias signal $V_{GB}$ at node B to a low level (e.g., at or near ground). When the voltage level of the bias signal $V_{GB}$ is pulled down to a low level, the capacitor component $C_R$ no longer charges and charge stored in the capacitor component $C_R$ may discharge through the diode $D_R$ and further through the second transistor 414 to ground.

Figure 5:
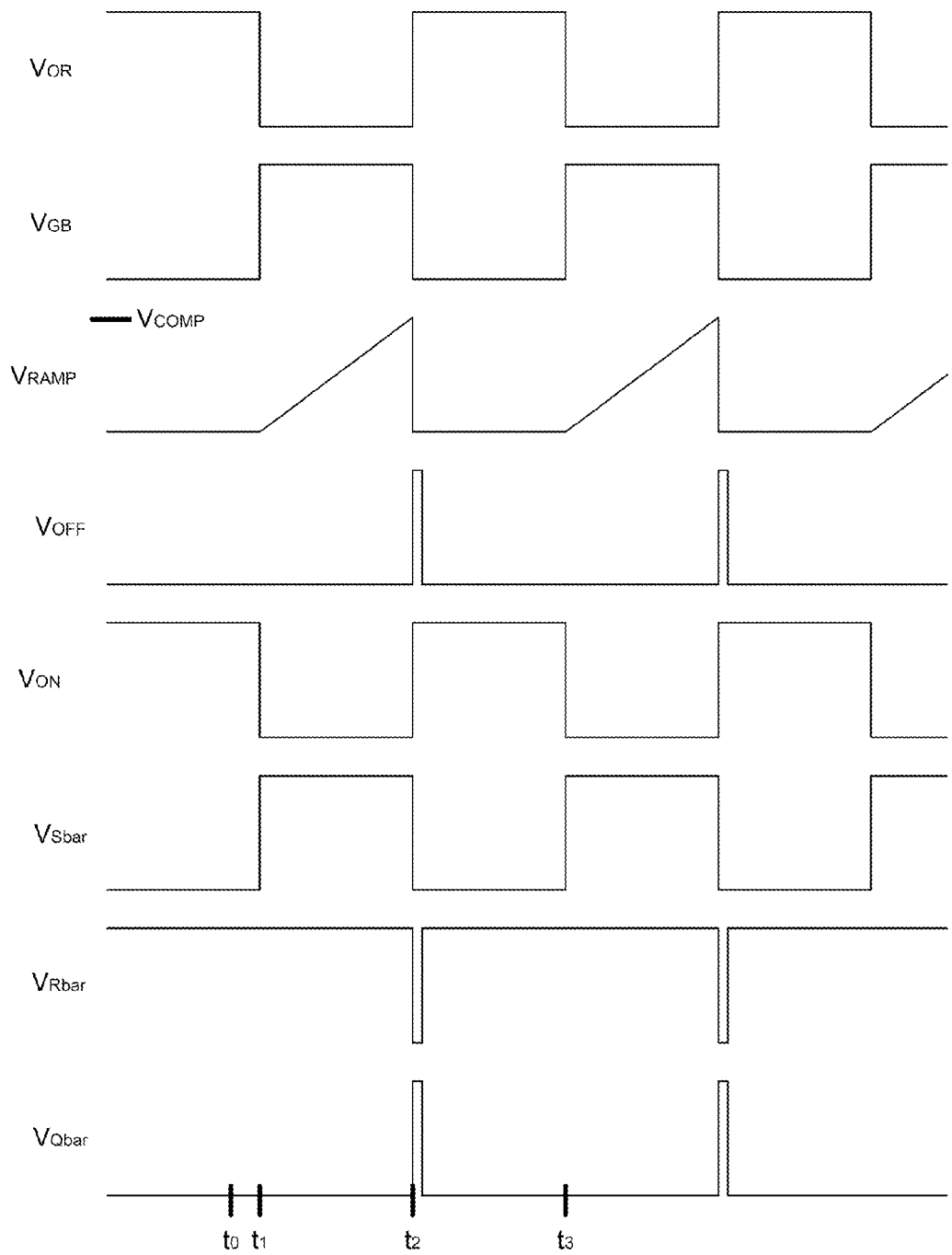
FIG. 5 shows a timing diagram of signals being generated by the example switching controller circuitry and the example turn-off circuitry of FIGS. 2 and 4, respectively.

FIG. 5 shows a timing diagram of the bias signal $V_{GB}$, the ramp signal $V_{RAMP}$, the off signal $V_{OFF}$, and the on signal $V_{ON}$, along with the output signals $V_{OR}$, $V_{Sbar}$, $V_{Rbar}$, and $V_{Qbar}$. For simplicity, any delays between the signals and rise or fall times associates with the signals are not shown. The timing diagram may begin at an initial time $t_0$ shortly before the energy stored in the inductive storage circuitry 108 is depleted and the on signal $V_{ON}$ falls from a high level to a low level. As previously described, the inductive storage circuitry 108 may discharge when the switching circuitry 110 is turned off, and so the bias signal $V_{GB}$ is at a low level. The push-pull circuit 410 may pull down the bias signal $V_{GB}$ to the low voltage level when the output $V_{OR}$ of the logic OR gate circuit 408 is at a high voltage level. Because the on signal $V_{ON}$ is at a high level, the output $V_{Sbar}$ of the second inverter circuit 404 may be at a low level. Also, at time $t_0$, the ramp signal $V_{RAMP}$ has not yet begun ramping up, and so the voltage of the ramp signal $V_{RAMP}$ may be at the low ramp level. In turn, the off signal $V_{OFF}$ may be at a low level and the output $V_{Rbar}$ of the first inverter circuit 402 may be correspondingly at a high level. In accordance with operation of the SR flip flop 406, the $Q_{bar}$ output $V_{Qbar}$ may be at a low level. With the on signal $V_{ON}$ being at a high level and the output $V_{Qbar}$ being at a low level, the logic OR gate circuit 408 may generate the output $V_{OR}$ at the high voltage level.

At time $t_1$, the energy being discharged may be depleted and the on signal $V_{ON}$ may fall to the low voltage level. The output $V_{Sbar}$ of the second inverter circuit 404 may correspondingly transfer to a high level. In addition, at time $t_1$, the voltage level of the ramp signal $V_{RAMP}$ may begin to rise. However, because it has not yet reached the comparison voltage $V_{COMP}$, the off signal $V_{OUT}$ output by the comparator circuit 402 may remain at a low level and the output of the first inverter circuit 402 may correspondingly remain at a high level. In accordance with the operation of the SR flip flop 406, the $Q_{bar}$ output $V_{Qbar}$ may remain at a low level. Because both the on signal $V_{ON}$ and the $Q_{bar}$ output $V_{Qbar}$ are at low levels, the output $V_{OR}$ of the logic OR gate circuit 408 may transition to a low level. In turn, the push-pull circuit 410 may pull up the voltage level of the bias signal $V_{GB}$ to a high level, which may cause the voltage level of the of the ramp signal $V_{RAMP}$ generated at node C to increase in accordance with the RC time constant determined by the resistance of the resistor component $R_R$ and the capacitance of the capacitor component $C_R$.

At time $t_2$, the voltage level of the ramp signal $V_{RAMP}$ may reach the threshold voltage $V_{COMP}$, which may cause the comparator circuit 202 to transition the off signal $V_{OFF}$ from the low level to a high level. In turn, the output $V_{Rbar}$ of the first inverter circuit 402 may correspondingly transition to a low level. In response, the $Q_{bar}$ output $V_{Qbar}$ may transition to a high level in accordance with operation of the SR flip flop 406 since the output $V_{Sbar}$ of the second inverter circuit 404 may still be at high level. In turn, the output $V_{OR}$ of the logic OR gate circuit 408 may transition to a high level, which may cause the push-pull circuit 410 to pull down the voltage of the bias signal $V_{GB}$ to a low level. In response to voltage level of the bias signal $V_{GB}$ transitioning to the low level, the switching circuitry 110 may turn off, which may cause the on signal $V_{ON}$ to transition to a high level and the inductive storage circuitry 108 to begin discharging. The output $V_{Sbar}$ of the second inverter circuit 308 may correspondingly transition to a low level.

Additionally, in response to the voltage level of the bias signal $V_{GB}$ transitioning to the low level, the capacitor component $C_R$ may no longer charge and the charge stored in the capacitor component $C_R$ may discharge through the diode $D_R$ and the second transistor 414 to ground. Accordingly, the voltage level of the ramp signal $V_{RAMP}$ may transition back down to the first ramp level. In turn, the off signal $V_{OFF}$ generated by the comparator circuit 202 may transition back to a low level and the output $V_{Rbar}$ of the first inverter circuit 402 may correspondingly transition back up to a high level. With the output $V_{Sbar}$ of the second inverter circuit 404 being at a low level and the output $V_{Rbar}$ of the first inverter circuit 402 being at a high level, the $Q_{bar}$ output $V_{Qbar}$ may transition back down to a low level in accordance with operation of the SR flip flop 406. In turn, with the on signal $V_{ON}$ being at a high level and the $Q_{bar}$ output $V_{Qbar}$ being at a low level, the output $V_{OR}$ of the logic OR gate circuit 408 may remain at the high level. The voltage levels of the signals may remain at their respective high and low levels until the energy stored in the inductor storage circuitry 108 is depleted, which may cause the voltage of the on signal $V_{ON}$ to fall to a low level and a next switching cycle may begin.

Figure 6:
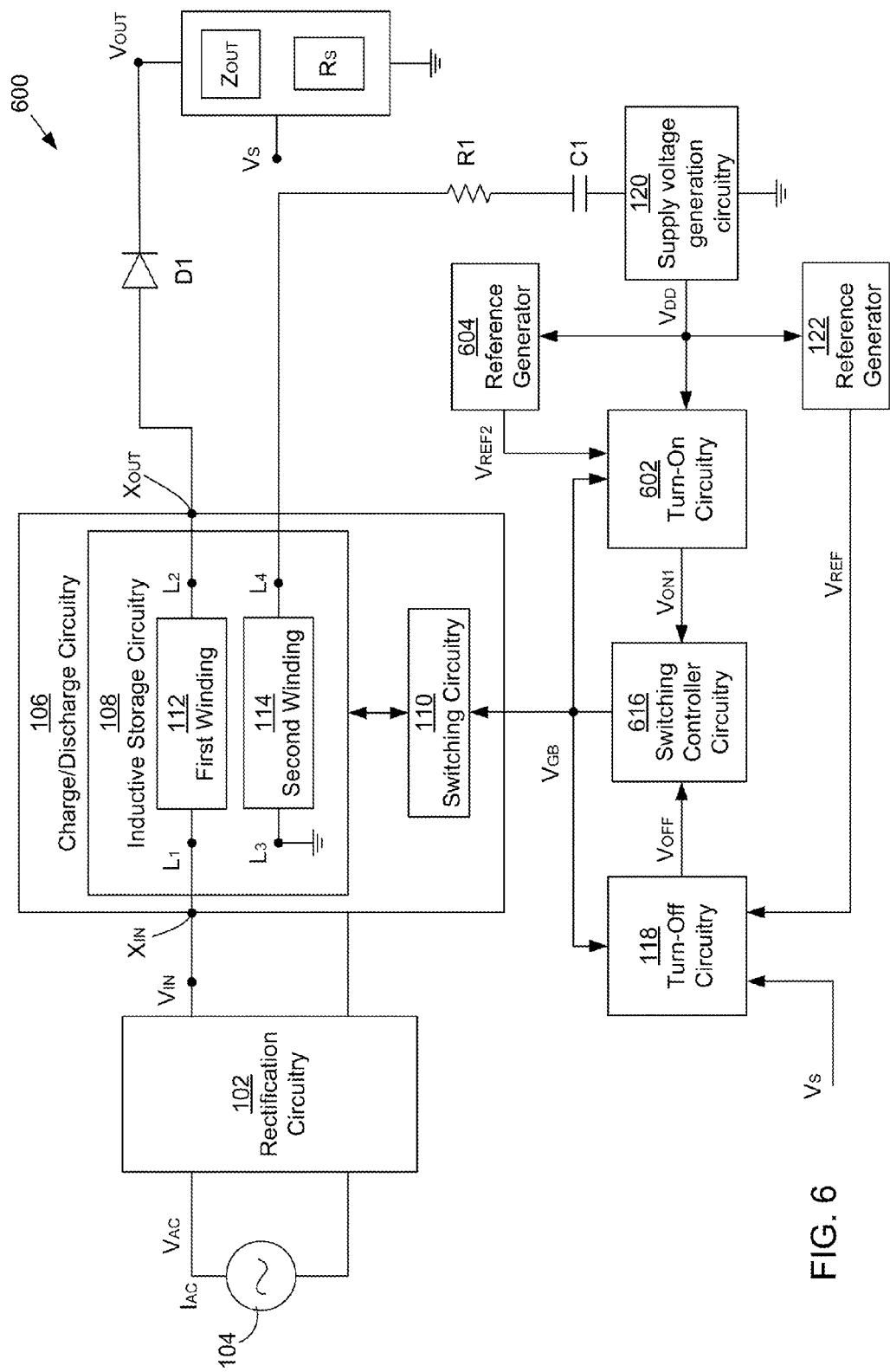
FIG. 6 shows another a schematic diagram of another example switched mode power supply.

FIG. 6 shows a schematic diagram of another example switched mode power supply 600. The switched mode power supply 600 shown in FIG. 6 may be similar to the switched mode power supply 100 shown in FIG. 1, except that instead of generating the on signal $V_{ON}$ from the second winding 114, the switched mode power supply 600 may generate an on signal $V_{ON1}$ using turn-on circuitry 602. In particular, the turn-on circuitry 602 may have an input coupled to the output of switching controller circuitry 616 and configured to receive the bias signal $V_{GB}$. When the voltage of the bias signal $V_{GB}$ transitions to the second voltage level to turn off the switching circuitry 110, the turn-on circuitry 602 may detect the transition and begin waiting or counting for a time period. As with the time period that the turn-off circuitry 118 waits, the time period that the turn-on circuitry 602 waits may be any amount of elapsed time, including a predetermined time period, a time period determined or calculated in real time, a static time period over multiple switching cycles, a dynamic time period or multiple time switching cycles, an amount of time based on feedback control, a time period determined by circuit components of the switched power supply 100, or combinations thereof, as non-limiting examples.

During the time period, the voltage level of the on signal $V_{ON1}$ may be at a first level. When the time period expires, the turn-on circuitry 602 may output the on signal $V_{ON1}$ to cause the switching controller circuitry 616 to turn on the switching circuitry 110. For example, the turn-on circuitry 602 may transition the on signal $V_{ON1}$ from the first level to a second level. For some example configurations, the first level may be higher than the second level such that when the time period expires, the transition from the first level to the second level is a falling-edge transition. In other example configurations, the first level may be lower than the second level such that when the time period expires, the transition is a rising-edge transition.

Switching controller circuitry 616 may be configured to receive the on signal $V_{ON1}$ from the turn-on circuitry 602. When the switching controller circuitry 616 detects the transition from the first level to the second level, the switching controller circuitry 616 may be configured to set the voltage of the bias signal $V_{GB}$ to the first voltage level to turn on the switching circuitry 110. Alternatively, when the level of the on signal $V_{ON1}$ does not detect a transition of the on signal $V_{ON1}$ from the first level to the second level, such as when the voltage level of the on signal $V_{ON1}$ is being maintained or transitions from the second level to the first level, then the switching controller circuitry 616 may be configured to maintain the level of the bias signal $V_{GB}$ at its current level.

In addition, the switching controller circuitry 616 may be configured to receive and operate in response to receipt of the off signal $V_{OFF}$ from the turn-off circuitry 118 in the same way as the switching controller 116. When the switching controller circuitry 616 detects a transition of the off signal $V_{OFF}$ from a first level to a second level, then the switching controller circuitry 616 may set the level of the bias signal $V_{GB}$ to a low level to turn off the switching circuitry 110. Alternatively, when the switching controller circuitry 616 does not detect a transition of the off signal $V_{OFF}$ from the first level to the second level, such as when the level of the off signal $V_{OFF}$ is being maintained or transitions from the second level to the first level, then the switching controller 616 may be configured to maintain the level of the bias signal $V_{GB}$ at its current level.

Accordingly, the switched mode power supply 600 may be configured to keep track of two time periods, a first time period tracked by the turn-off circuitry 118 and a second time period tracked by the turn-on circuitry 602. The first time period may begin when the switching controller circuitry 616 turns on the switching circuitry 110. When the first time period expires, the turn-off circuitry 118 may transition the off signal $V_{OFF}$ from a first level to a second level, which may cause the switching controller circuitry 616 to turn off the switching circuitry 110. When the switching circuitry 110 turns off, the second time period may begin. Subsequently, when the second time period expires, the turn-on circuitry 602 may transition the on signal $V_{ON1}$ from a first level to a second level, which may cause the switching controller circuitry 616 to turn on the switching circuitry 110, and the switching cycle may be repeated.

For some example configurations, the second time period that the turn-on circuitry 602 waits may be constant over multiple switching cycles, which may cause the switching circuitry 110 to operate in a constant off time mode. When the switching circuitry 110 operates in both a constant on time mode and a constant off time mode, the frequency of the switching cycle may be constant or fixed.

For some example configurations, the turn-on circuitry 602 may be configured to detect when the time period expires by comparing a level of a second ramp signal $V_{RAMP2}$ (not shown in FIG. 6) with a second reference voltage $V_{REF2}$. The second ramp signal $V_{RAMP2}$ may be generated internally by the turn-on circuitry 602 and in general, may be any signal that changes its level, either by increasing or decreasing, linearly or non-linearly, from a first level toward the second reference voltage $V_{REF2}$ over a period of time. The second reference voltage $V_{REF2}$ may be generated by a voltage reference generator 604, such as a voltage regulator or other reference generating circuitry.

When the turn-on circuitry 602 detects that the voltage of the bias signal $V_{GB}$ has transitioned to the second voltage level to turn off the switching circuitry 110, the level of the second ramp signal $V_{RAMP2}$ may begin changing from the first ramp level toward the second reference voltage $V_{REF2}$. When the level of the second ramp signal $V_{RAMP2}$ reaches or exceeds the second reference voltage $V_{REF2}$, the turn-on circuitry 602 may transition the on signal $V_{ON1}$ from the first level to the second level so that the switching controller circuitry 616 outputs the bias signal $V_{GB}$ at the first voltage level to turn on the switching circuitry 110.

For example configurations where the off time is constant, the turn-on circuitry 602 may be configured to generate the second ramp signal $V_{RAMP2}$ so that the level of the second ramp signal $V_{RAMP2}$ changes at the same rate such that the time that the second ramp signal $V_{RAMP2}$ takes to change from the first ramp level to the reference voltage $V_{REF2}$ is the same or constant over multiple switching cycles. For some examples, the second ramp signal $V_{RAMP2}$ may change at a constant rate over multiple switching cycles in accordance with a time constant, such as a RC time constant.

Figure 7:
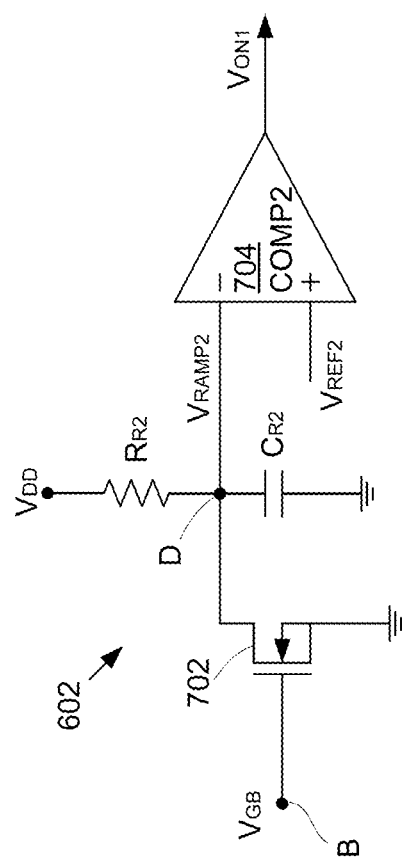
FIG. 7 shows a schematic diagram of example turn-on circuitry.

FIG. 7 shows a schematic diagram of an example circuit implementation of the turn-on circuitry 602. The example circuit implementation of the turn-on circuitry 602 may include a switch 702 coupled to node B where the bias signal $V_{GB}$ is generated. The switch 702 may turn on when the voltage of the bias signal $V_{GB}$ is at a high level, and the switch 702 may turn off when the voltage of the bias signal $V_{GB}$ is at a low level. An example switch 702 may be an n-channel MOSFET having a gate terminal coupled to bias signal $V_{GB}$ at node B, although other types of switches may be used.

The turn-on circuitry 602 may also include ramp generation circuitry configured to generate the second ramp signal $V_{RAMP2}$. For the example configuration shown in FIG. 7, the ramp generation circuitry may include a resistor-capacitor circuit comprising a resistor component $R_{R2}$ and a capacitor component $C_{R2}$. The resistor component $R_{R2}$ may be a single resistor, a plurality of resistors connected in series, parallel, or combinations thereof, or other similar resistive circuits configured to provide a resistance. Similarly, the capacitor component $C_{R2}$ may be a single capacitor, a plurality of capacitors connected in series, parallel, or combinations thereof, or other similar capacitive circuits configured to provide a capacitance. First ends of the resistor component $R_{R2}$ and the capacitor component $C_{R2}$ may be coupled together at a node D. A second end of the resistor component $R_{R2}$ may be coupled to the supply voltage $V_{DD}$ and a second end of the capacitor component $C_{R2}$ may be coupled to ground. A drain terminal of the switch 702 may be coupled to the first ends of the resistor component $R_{R2}$ and the capacitor component $C_{R2}$ at node D, and a source terminal of the switch 702 may be coupled to ground.

The turn-on circuitry 602 may be configured to generate the second ramp signal $V_{RAMP2}$ across the capacitor component $C_{R2}$ at node D. In addition, the turn-on circuitry 602 may be configured to use the bias signal $V_{GB}$ as a reset to either pull down and maintain the level of the second ramp signal $V_{RAMP2}$ to the first ramp level, or to allow the level of the second ramp signal to increase to a second reference voltage $V_{REF2}$. In particular, when the bias signal $V_{GB}$ is at a first, high level to turn on the switching circuitry 110, the switch 702 may be correspondingly turned on, and the voltage level of the second ramp signal $V_{RAMP2}$ at node D may be coupled or pulled down to a first ramp level (e.g., at or near ground). Alternatively, when the bias signal $V_{GB}$ is at a second, low level to turn off the switching circuitry 110, the switch 702 may be correspondingly turned off, and the voltage of the second ramp signal $V_{RAMP2}$ at node D may increase from the first ramp level. Similar to the ramp generation circuitry of the turn-off circuitry 118, the ramp generation circuitry of the turn-on circuitry 602 may generate a current based on the supply voltage $V_{DD}$ and a RC time constant determined by the resistance provided by the resistor component $R_{R2}$ and the capacitance provided by the capacitor component $C_{R2}$. The current may flow through the resistor component $R_{R2}$ to the capacitor component $C_{R2}$, and the capacitor component $C_{R2}$ may begin to charge in response to the current. In turn, the voltage level of the second ramp signal $V_{RAMP2}$ generated across the capacitor component $C_{R2}$ at node D may increase from the first ramp level at a rate determined by the RC time constant. Accordingly, the voltage level of the second ramp signal $V_{RAMP2}$ as a function of time may depend on the supply voltage $V_{DD}$, and the RC time constant.

The resistance and capacitance values as determined by the resistor and capacitor components $R_{R2}$, $C_{R2}$ may be fixed, and so the voltage level of the second ramp signal $V_{RAMP2}$ may increase at the same rate in accordance with the RC time constant over multiple switching cycles. As such, the time period that the turn-on circuitry 602 waits before triggering the switching controller circuitry 616 to turn on the switching circuitry 110 may be constant over multiple switching cycles, which may cause the switching circuitry 110 to operate in a constant off time mode.

The timer circuitry 602 may further include a comparator circuit (COMP2) 704 having a first, negative input terminal coupled to node D and configured to receive the second ramp signal $V_{RAMP2}$, and a second, positive input terminal configured to receive a second reference voltage $V_{REF2}$. The comparator circuit 604 may be configured to generate the on signal $V_{ON1}$ based on a comparison of the second ramp signal $V_{RAMP2}$ and the second reference voltage $V_{REF2}$. As long as the level of the second ramp signal $V_{RAMP2}$ is below the second reference voltage $V_{REF2}$, the comparator circuit 704 may be configured to generate the on signal $V_{ON1}$ at a high level. Alternatively, when the second ramp signal $V_{RAMP2}$ reaches or exceeds the second reference voltage $V_{REF2}$, the comparator circuit 704 may be configured to generate the on signal $V_{ON1}$ at a low level.

Figure 8:
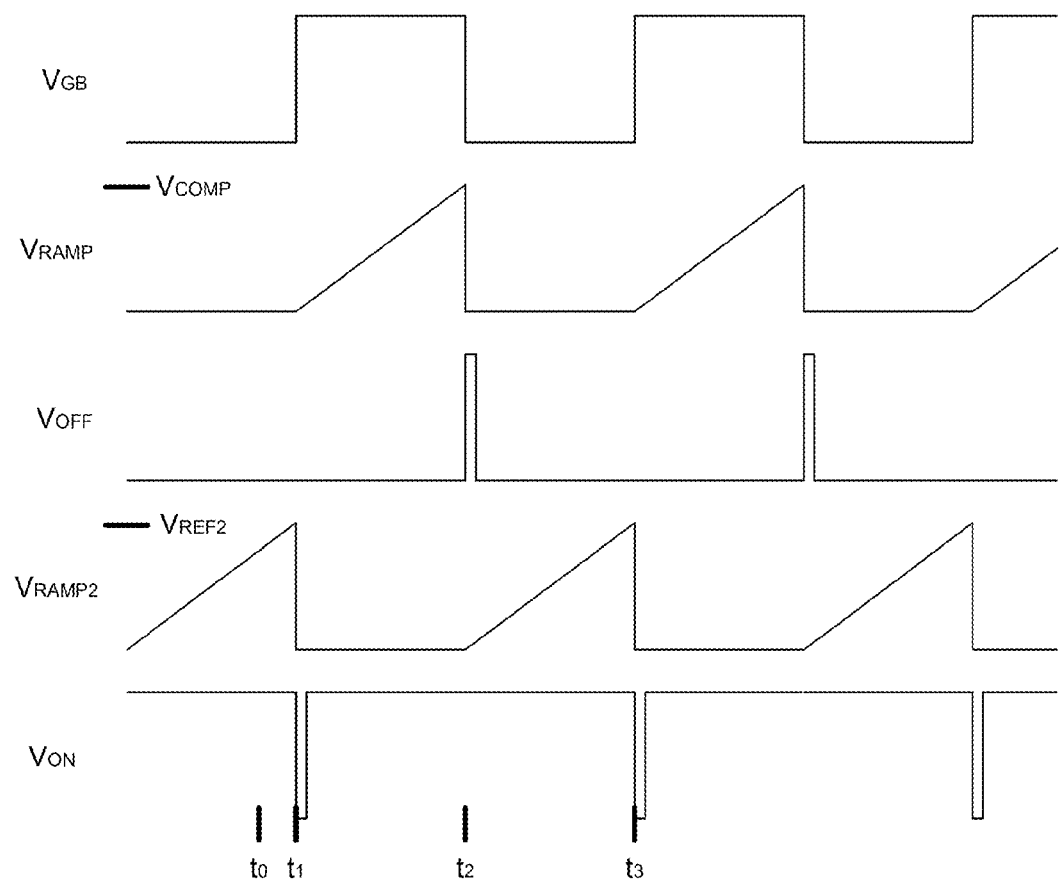
FIG. 8 shows a timing diagram of signals being generated by the example switched mode power supply with the example turn-on circuitry of FIGS. 6 and 7.

FIG. 8 shows a timing diagram, of the bias signal $V_{GB}$, the ramp signal $V_{RAMP}$, the second ramp signal $V_{RAMP2}$, the off signal $V_{OFF}$, and the on signal $V_{ON1}$ being generated in the switched mode power supply 600 using the example implementations of the turn-off circuitry 118 shown in FIG. 2 and the turn-on circuitry 602 shown in FIG. 7. At an initial time $t_0$, shortly before the increasing voltage level of the second ramp signal $V_{RAMP2}$ reaches the second reference voltage $V_{REF2}$, the on signal $V_{ON1}$ may be at a high level, and the bias signal $V_{GB}$, the first ramp signal $V_{RAMP}$, and the off signal $V_{OFF}$ may be at low level. At a time $t_1$, the level of the second ramp signal $V_{RAMP2}$ may reach or exceed the second reference voltage $V_{REF2}$, which may cause the comparator circuit 704 to transition the on signal $V_{ON1}$ from the high level to the low level. The switching controller circuitry 616 may detect the high-to-low transition and in response, pull up the bias signal $V_{GB}$ to a high voltage level to turn on the switching circuitry 110.

In response to the bias signal $V_{GB}$ being pulled up to a high level, the level of the first ramp signal $V_{RAMP}$ may begin increasing from the first ramp level in accordance with the RC time constant as determined by the resistance of the resistor component $R_R$ and the capacitance of the capacitor component $C_R$ of the turn-off circuitry 118 (FIG. 2). Additionally, the high level of the bias signal $V_{GB}$ may turn on the switch 702 of the turn-on circuitry 602, and charge stored in the capacitor component $C_{R2}$ may discharge through the switch 702 to ground. In turn, the voltage level of the second ramp signal $V_{RAMP2}$ may fall back low. The second ramp signal $V_{RAMP2}$ may remain at the low level while the switch 702 is turned on. When the level of the second ramp signal $V_{RAMP2}$ falls back low, the second reference voltage $V_{REF2}$ may again be above the level of the second ramp signal $V_{RAMP2}$, which may cause the comparator circuit 704 to transition the on signal $V_{ON1}$ back to the high level. The low-to-high transition of the on signal $V_{ON1}$ may have no effect on the switching controller circuitry 616, which may continue to output the bias signal $V_{GB}$ at the high level to keep the switching circuitry 110 turned on.

At a subsequent time $t_2$, the level of the first ramp signal $V_{RAMP}$ may reach the threshold voltage $V_{COMP}$. In response, the comparator circuit 202 of the turn-off circuitry 118 may transition the off signal $V_{OFF}$ from the low level to the high level. The switching controller circuitry 616 may detect the low-to-high transition and in response, may transition the level of the bias signal $V_{GB}$ to a low voltage level to turn off the switching circuitry 110. With bias signal $V_{GB}$ at the low voltage level, charge stored in the capacitor component $C_R$ may discharge through the diode $D_R$ to ground and the level of the first ramp signal $V_{RAMP}$ may fall back low to the first ramp level. When the level of the first ramp signal $V_{RAMP}$ falls back low, the threshold voltage $V_{COMP}$ may again be above the level of the first ramp signal $V_{RAMP}$, which may cause the comparator circuit 202 to transition the off signal $V_{OFF}$ back to the low level. The high-to-low transition of the off signal $V_{OFF}$ may have no effect on the switching controller circuitry 616, which may continue to output the bias signal $V_{GB}$ at the low level to keep the switching circuitry 110 turned off.

Additionally, in response to the level of the bias signal $V_{GB}$ transitioning low at time $t_2$, the switch 702 of the turn-on circuitry 602 may turn off, which may cause the level of the second ramp signal $V_{RAMP2}$ to begin increasing in accordance with the RC time constant provided the resistance of the resistor component $R_{R2}$ and the capacitance of the capacitor component $C_{R2}$. The second ramp signal $V_{RAMP2}$ may continue increasing while the bias signal $V_{GB}$, the first ramp signal $V_{RAMP}$, the on signal $V_{ON1}$, and the off signal $V_{OFF}$ remain at their respective levels until the level of the second ramp signal $V_{RAMP2}$ reaches the second reference voltage $V_{REF}$ at a subsequent time $t_3$ and a next switching cycle begins.

Referring back to FIG. 1, as previously described, the example switched mode power supply 100 may generate the on signal $V_{ON}$ based on the voltage $V_4$ generated at the second end $L_4$ of the second winding 114. The voltage $V_4$ generated at the second end $L_4$ may depend on the amount of energy stored in the inductive storage circuitry 108, which in turn may depend on the AC voltage $V_{AC}$ provided by the AC power supply 104. Accordingly, the voltage $V_4$ generated at the second end $L_4$ and the corresponding voltage level of the on signal $V_{ON}$ may change based on varying levels of the AC voltage $V_{AC}$.

For some situations, the amount of energy stored in the inductive storage circuitry 108 may be so low that a voltage swing between high and low levels of the on signal $V_{ON}$ may be insufficient to start a next switching cycle. For example, when the switching circuitry 110 turns off, if the amount of energy stored in the inductive storage circuitry 108 is too low, the on signal $V_{ON}$ may not swing to a sufficiently high level such that when the level of the on signal $V_{ON}$ subsequently transitions back low due to the energy in the inductive storage circuitry 108 being depleted, the switching controller circuitry 116 may not recognize the falling edge transition. Consequently, the switching controller circuitry 116 may not turn on the switching circuitry 110 and start a next switching cycle. As a result, switching cycles may be skipped, which may cause undesirable effects in the output load $Z_{OUT}$. For example, in lighting applications where the output load $Z_{OUT}$ is a light source, flickering may be experienced when the switching circuitry 110 does not switch as intended.

Example situations where an insufficient amount of energy may occur may be at or near the zero-crossing of the AC voltage $V_{AC}$. Additionally, in lighting applications that use dimmers, such as triac dimmers, AC power being supplied from the AC power supply 104 to the rectification circuitry 102 may be limited, which may cause an insufficient amount of energy to be stored by the inductive storage circuitry 108.

Figure 9:
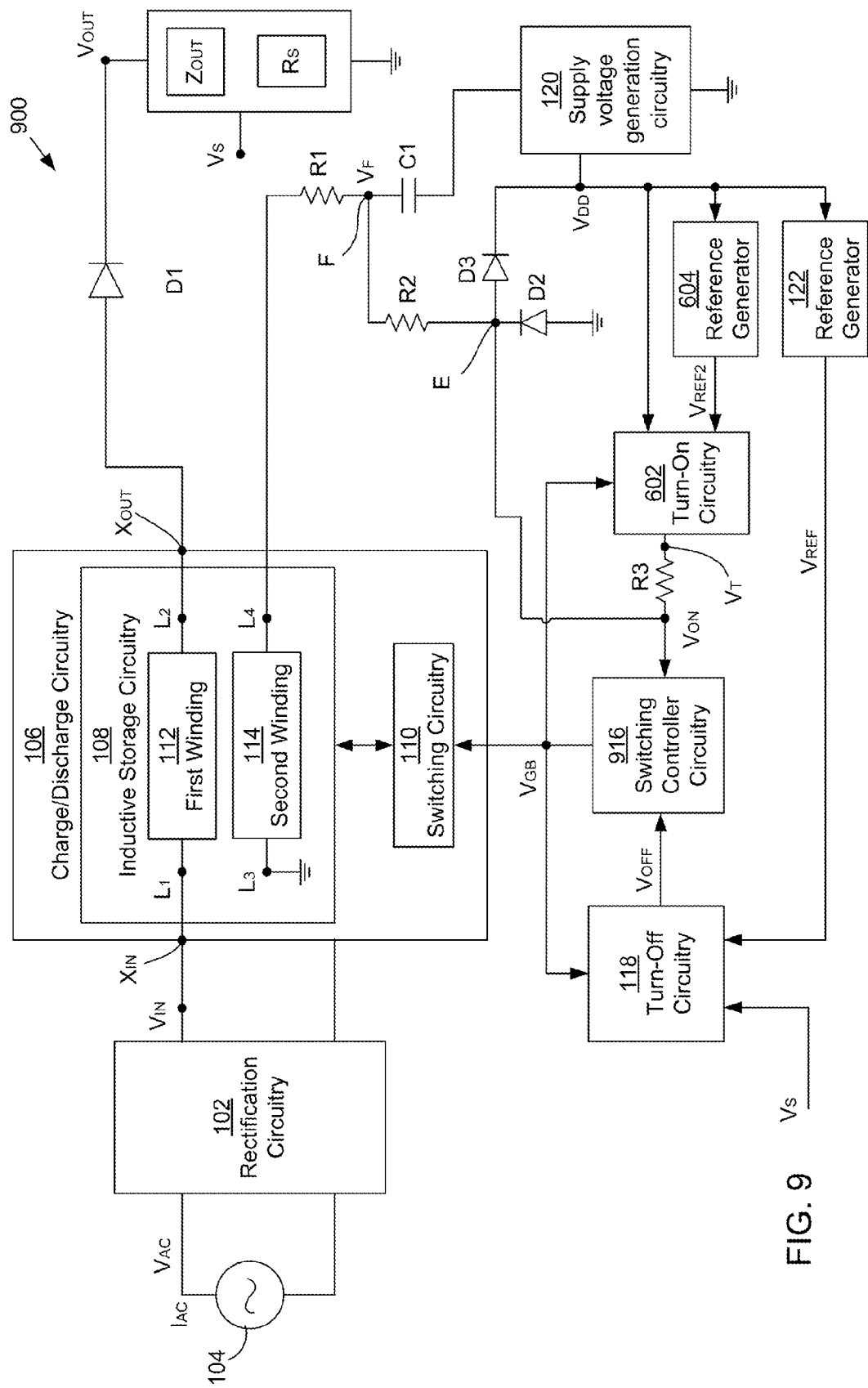
FIG. 9 shows a schematic diagram of a third example switched mode power supply.

FIG. 9 shows a schematic diagram of another example switched mode power supply 900 that includes circuitries of both the example switched mode power supply 100 and the example switched mode power supply 600 used to generate the on signal $V_{ON}$. As shown in FIG. 9, the output $V_{OUT1}$ of the turn-on circuitry 602 may be coupled to a node E, which is where the on signal $V_{ON}$ is generated in the switched power supply 100. The output $V_{OUT1}$ of the turn-on circuitry 602 may be coupled to node E via a resistor R3, which may be representative of a single resistor, a plurality of resistor connected in series, parallel, or combinations thereof, or other similar circuitry that provides a resistance. The level of the on signal $V_{ON}$ generated at node E may then be based on a combination of the voltage $V_4$ generated at the second end $L_4$ of the second winding 114 and the output $V_{ON1}$ of the turn-on circuitry 602.

For the switched mode power supply 900, the second time period for which the turn-on circuitry 602 is configured to wait may be set longer than the time determined for the inductive storage circuitry 108 to take to discharge the stored energy. Accordingly, when the high level of the voltage generated at node E is at a sufficient level to start a next switching cycle, a next switching cycle may begin upon depletion of the stored energy and before the second time period expires, such as before the second ramp signal $V_{RAMP2}$ generated by turn-on circuitry 602 reaches the second reference voltage $V_{REF2}$. Alternatively, when the high level of the voltage generated at node E is insufficient to start a next switching cycle (i.e., when there is an insufficient voltage swing in the falling-edge transition), then the next switching cycle may begin upon expiration of the second time period, such as when the voltage of the second ramp signal $V_{RAMP2}$ reaches the reference voltage $V_{REF2}$. Subsequently, when a sufficient amount of energy is again stored in the inductive energy storage circuitry 110, the high-to-low transition of the voltage $V_4$ generated at the second winding 114 may start a next switching cycle before the second time period expires.

Switching controller circuitry 916 may function in the same or similar way as the switching controller circuitry 616 of the example switched mode power supply 600. When the switching controller circuitry 916 detects a transition of the on-signal $V_{ON}$ from a first level to the second level, the switching controller circuitry 916 may be configured to set the voltage of the bias signal $V_{GB}$ to the first voltage level to turn on the switching circuitry 110. Alternatively, when the level of the on signal $V_{ON}$ does not detect a transition of the on signal $V_{ON}$ from the first level to the second level, such as when the voltage level of the on signal $V_{ON}$ is being maintained, transitions from the second level to the first level, or the transition from the first level to the second level has an insufficient voltage swing for detection by the switching controller circuitry 916, then the switching controller circuitry 916 may be configured to maintain the level of the bias signal $V_{GB}$ at its current level. Similarly, when the switching controller circuitry 616 detects a transition of the off signal $V_{OFF}$ from a first level to a second level, then the switching controller circuitry 616 may set the level of the bias signal $V_{GB}$ to a low level to turn off the switching circuitry 110. Alternatively, when the switching controller circuitry 616 does not detect a transition of the off signal $V_{OFF}$ from the first level to the second level, such as when the level of the off signal $V_{OFF}$ is being maintained or transitions from the second level to the first level, then the switching controller 616 may be configured to maintain the level of the bias signal $V_{GB}$ at its current level.

The resistors R2 and R3 may function as a voltage divider for the output voltage $V_{OUT1}$ and the voltage $V_F$ generated at node F where the resistors R1, R2, and the coupling capacitor C1 are connected so that sufficient voltage levels are generated for the on signal $V_{ON}$ at node E regardless of whether a sufficient amount or an insufficient amount of energy is stored in the inductive storage circuitry 108. As long as a sufficient amount of energy is stored in the inductive storage circuitry 108, the voltage of the second ramp signal $V_{RAMP2}$ may never reach the second reference voltage $V_{REF2}$ and the output $V_{OUT1}$ of the turn-on circuitry 602 may be maintained at a high level. However, even with the output $V_{OUT1}$ being maintained at a high level, the high and low voltage levels of the voltage $V_F$ generated at node F, along with the voltage division provided by the resistors R2 and R3, may yield a swing of high and low voltage levels of the on signal $V_{ON}$ that may be sufficient for detection by the switching controller circuitry 116 to turn on the switching circuitry 110.

Alternatively, when an insufficient amount of energy is stored in the inductive storage circuitry 108, and when that insufficient amount of energy is depleted, the high-to-low transition of the voltage generated at node F may not provide a sufficient high-to-low transition of the on signal $V_{ON}$ for detection by the switching controller circuitry 916. Subsequently, when the second time period expires, the turn-on circuitry 602 may generate the output $V_{OUT1}$ at the low level, which in turn may cause the voltage level of the on signal $V_{ON}$ at node E to fall to a sufficiently low level such that a sufficient high-to-low transition is detected by the switching controller circuitry 916.

Figure 10:
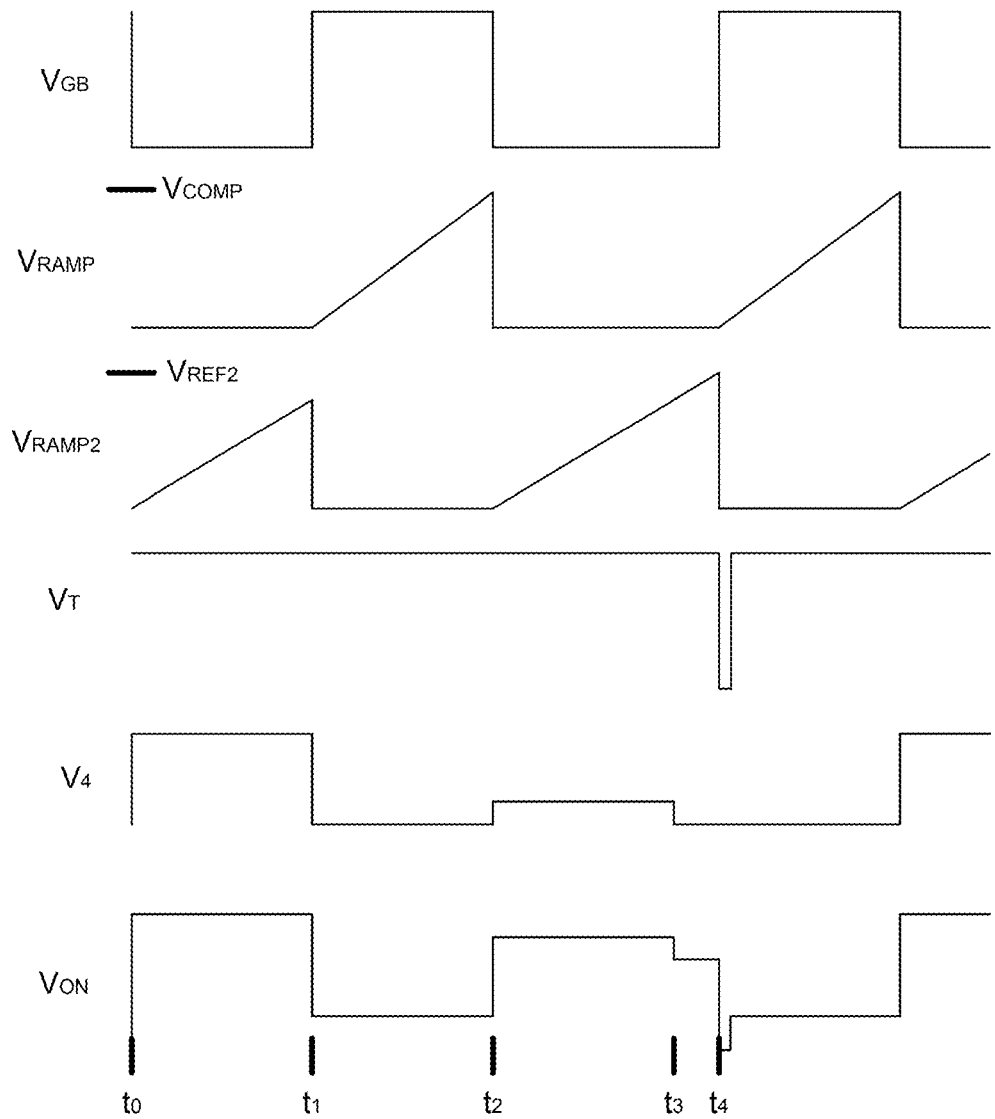
FIG. 10 shows a timing diagram of signals being generated by the example switched mode power supply of FIG. 9.

FIG. 10 shows a timing diagram illustrating the use of the voltage $V_4$ generated at the second winding 114 and the output $V_{OUT1}$ of the turn-on circuitry 602 in combination to generate the on signal $V_{ON}$. Assume a sufficient amount of energy is stored in the inductive storage circuitry 108 such that at an initial time $t_0$, when the bias signal $V_{GB}$ transitions to a low voltage level to turn off the switching circuitry 110, the voltage $V_4$ generated at the second end $L_4$ of the second winding 114 transitions to a sufficiently high level for the storage controller circuitry 916 to turn on the switching circuitry 110. Accordingly, at a subsequent time $t_1$ when the energy stored in the inductive storage circuitry 108 is depleted and the voltage $V_4$ transitions to a low level, the on signal $V_{ON}$ correspondingly makes a falling-edge transition with a sufficient voltage swing to cause the switching controller circuitry 916 to detect the falling-edge transition of the on signal $V_{ON}$ and transition the bias signal $V_{GB}$ to a high level in response. Also, as shown in FIG. 10, at time $t_1$, the level of the second ramp signal $V_{RAMP2}$ may not have reached the second reference voltage $V_{REF2}$ when the energy is depleted and the output $V_{OUT1}$ of the turn-on circuitry 602 may remain at a high level.

At a subsequent time $t_2$, the level of the first ramp signal $V_{RAMP}$ may reach the threshold voltage $V_{COMP}$. Assume that during the on time in between time $t_1$ and time $t_2$ while the inductive storage circuitry 108 is charging, an insufficient amount of energy is stored. Accordingly, at time $t_2$, the voltage $V_4$ may increase to an insufficient voltage level such that when the energy in the inductive storage circuitry 108 is depleted at time $t_3$, the voltage level of the on signal $V_{ON}$ does not fall to a low enough level for the switching controller circuitry 916 to detect the falling-edge transition. Accordingly, the switching controller circuitry 916 may keep the bias signal $V_{GB}$ at the low voltage level and the second ramp signal $V_{RAMP2}$ may continue to increase. Subsequently, at a time $t_4$, the second ramp signal $V_{RAMP2}$ may reach the second reference voltage $V_{REF2}$, which may cause the output $V_{OUT1}$ of the turn-on circuitry 602 to transition to a low level. In turn, the on signal $V_{ON}$ may make a falling-edge transition with a sufficient voltage swing for detection by the switching controller circuitry 916. Accordingly, the switching controller circuitry 916 may output the bias signal $V_{GB}$ at a high voltage level to turn on the switching circuitry 110.

As shown in FIG. 10, the second ramp signal $V_{RAMP2}$ may transition back down to a low level after reaching the second reference voltage $V_{REF2}$, and the output $V_{OUT1}$ may transition back to a high level, which may increase the level of the on signal $V_{ON}$. However, neither the rising-edge transition of the output $V_{OUT1}$ nor the rising-edge transition of the on signal $V_{ON}$ may affect the operation of the switching controller circuitry 916, which may maintain the bias signal $V_{GB}$ at the high voltage level to keep the switching circuitry 110 turned on.

Referring to FIGS. 6 and 9, the circuitry of the switched mode power supply 600 and/or the switched mode power supply 900 used to generate the bias signal $V_{GB}$, including the switching controller circuitry 616, the switching controller circuitry 916, the turn-off circuitry 118, the turn-on circuitry 602, the supply voltage generation circuitry 120, the reference generator 122, the reference generator 604, resistors R1, R2, R3, diodes D2, D3, and capacitor C1, may be implemented in hardware or a combination of hardware and software in various ways. For example, the circuitry may include analog components, digital components, or combinations thereof. In addition or alternatively, one, more than one, or all the circuitries may be implemented as a single integrated circuit (IC) or a plurality of integrated circuits, such as one or more field programmable gate arrays (FPGA), one or more application specific integrated circuits (ASIC), or combinations thereof. In addition or alternatively, the circuitry may include a hardware processor configured to execute software or firmware and/or digital or analog circuit components such as flip-flops, logic circuits, comparators, operational amplifiers and edge detectors as examples to perform one or more of the functions or operations of the switching controller circuitries 616, 916, the turn-off circuitry 118, and/or the turn-on circuitry 602.

Referring to FIGS. 1, 6, and 9, the output load $Z_{OUT}$, which may be considered part of the example switched mode power supplies 100, 600, 900, or alternatively separate from and connected to the example switched mode power supplies 100, 600, 900, may include one or more an active devices, one or more passive devices, or combinations thereof. In addition or alternatively, the output load $Z_{OUT}$ may be configured to conduct current, maintain a substantially constant voltage, and/or function as a current sink. In addition or alternatively, the output loads $Z_{OUT}$ may be configured to generate energy, light, and/or emit heat. Non-limiting examples may include one or more solid state light emitters such as light emitting diodes ("LEDs"), light sources other than LEDs, cooling systems, motors, gear units, resistive and/or inductive actuators, zener diodes, linear circuitry, pulse-width-modulated (PWM) converters, resistors, capacitors, inductors, various other types of diodes, or any combination thereof. In addition or alternatively, the output load $Z_{OUT}$ may include a single electronic component or circuit element, or a plurality of electronic components or circuit elements. The plurality of electronic components or circuit elements may be connected in series, in parallel, or a combination thereof. As an example illustration, an output load may include a single LED or a plurality of LEDs. The plurality of LEDs may be connected in series, in parallel, or a combination of serial and parallel connections. Various configurations of the output load $Z_{OUT}$ may be possible.

The switched mode power supplies 100, 600, 900 may be part of a system when configured in combination with and/or connected to the output load $Z_{OUT}$. For example, where the output load $Z_{OUT}$ is a light source, such as one or more LEDs, a lighting system may include any of the switched mode power supplies 100, 600, 900 connected to the one or more LEDs.

FIGS. 11-14 show schematic diagrams of the inductive storage circuitry 108 and the switching circuitry 110 of the charge/discharge circuitry 106 configured in various example power converter topologies. For each configuration, the first winding 112 may be a primary winding and the second winding 114 may be an auxiliary winding of the inductive storage circuitry 108. Also, the switching circuitry 110 is shown as being a single n-channel MOSFET (NMOS transistor) having a gate terminal configured to receive the bias signal $V_{GB}$, although other types of switches or other numbers of switches, such as two or more switches, may be used for the switching circuitry 110.

Figure 11:
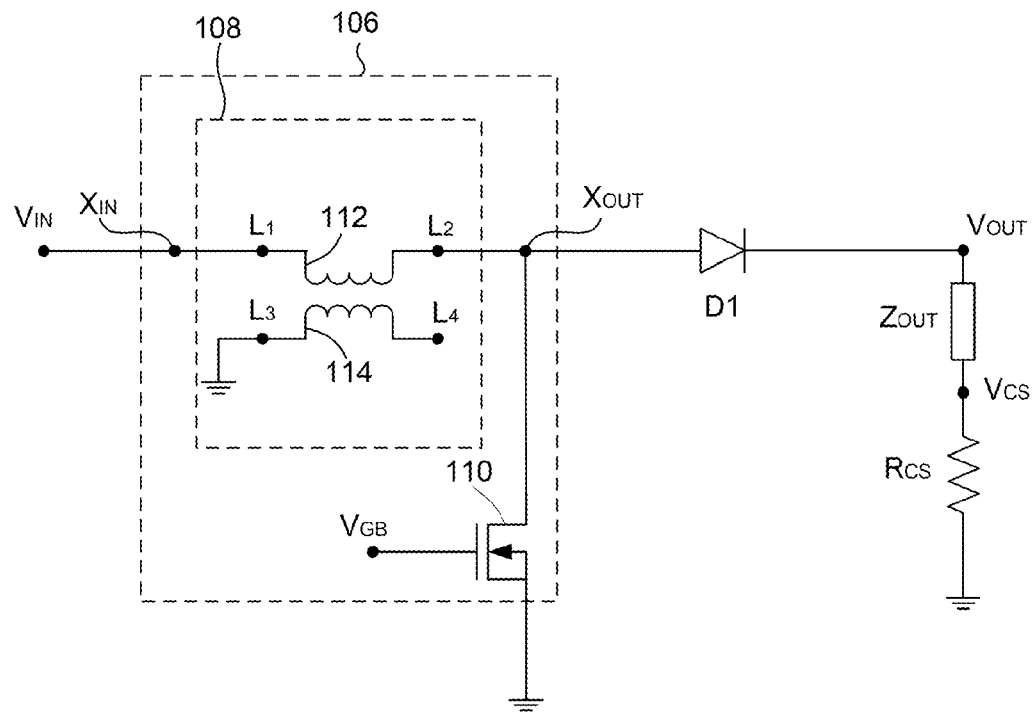
FIG. 11 shows a schematic diagram of inductive storage circuitry and switching circuitry configured in a boost power converter topology.

FIG. 11 shows the inductive storage circuitry 108 and the switching circuitry 110 configured in an example boost power converter topology. The first winding 112 may be a first inductor and the second winding 114 may be a second inductor. The first end $L_1$ may be coupled to the input terminal $X_{IN}$ and the input voltage $V_{IN}$. The second end $L_2$ may be coupled to the output terminal $X_{OUT}$, which may be coupled to the diode D1 and a drain terminal of the NMOS transistor 110. A source terminal of the NMOS transistor 110 may be coupled to ground.

When the NMOS transistor 110 turns on, the second end $L_2$ may be pulled to ground and the voltage $V_{21}$ across the first inductor 112 may correspond to the input voltage $V_{IN}$. The diode D1 may be reverse biased and charge may be stored in the inductive storage circuitry 108. When the NMOS transistor 110 turns off, the voltage $V_{21}$ may correspond to the difference between the output voltage $V_{OUT}$ and the input voltage $V_{IN}$. The diode D1 may be forward biased and charge stored in the first inductor 112 may be discharged through the inductor 112 to the output load $Z_{OUT}$.

Figure 12:
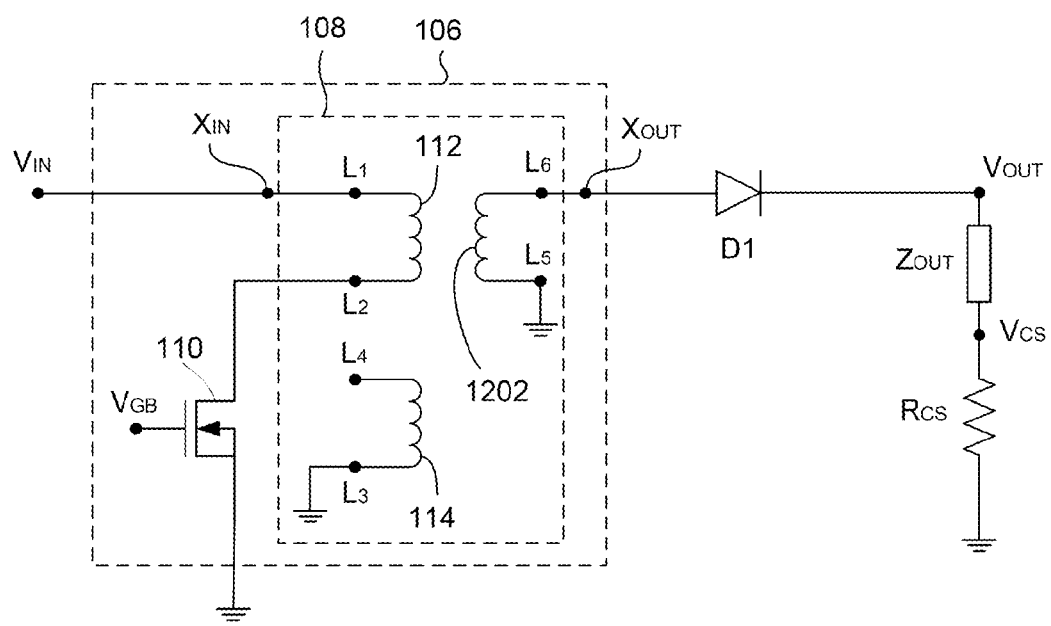
FIG. 12 shows a schematic diagram of inductive storage circuitry and switching circuitry configured in a flyback power converter topology.

FIG. 12 shows the inductive storage circuitry 108 and the switching circuitry 110 configured in an example flyback power converter topology. The first winding 112 may be part of a transformer circuit that also includes a third winding 1202. A first end $L_5$ of the third winding 1202 may be coupled to ground and a second end $L_6$ may be coupled to the output terminal $X_{OUT}$. The second end $L_2$ may be coupled to the output terminal $X_{OUT}$ via the second end $L_6$ of the third winding 1202 in that a voltage $V_{65}$ generated across the third winding 1202 may be proportional to the voltage $V_{21}$ generated across the first winding 112 according to a turns-ratio between the first and third windings 112, 1202, and charge stored in the transformer in response to the input voltage $V_{IN}$ may be discharged to the output load $Z_{OUT}$ via the second end $L_6$ of the third winding 1202.

When the NMOS transistor 110 turns on, the second end $L_2$ may be pulled to ground, and so the voltage $V_{21}$ may correspond to the input voltage $V_{IN}$. The proportionate voltage $V_6$ may cause the diode D1 to be reversed biased, and charge may be stored in the inductive storage circuitry 108. When the NMOS transistor 110 turns off, the voltage $V_6$ may increase to a level that forward biases the diode D1, and charge stored in the inductive storage circuitry 108 may be discharged to the output load $Z_{OUT}$ via the second end $L_6$ of the third winding 1202.

Figure 13:
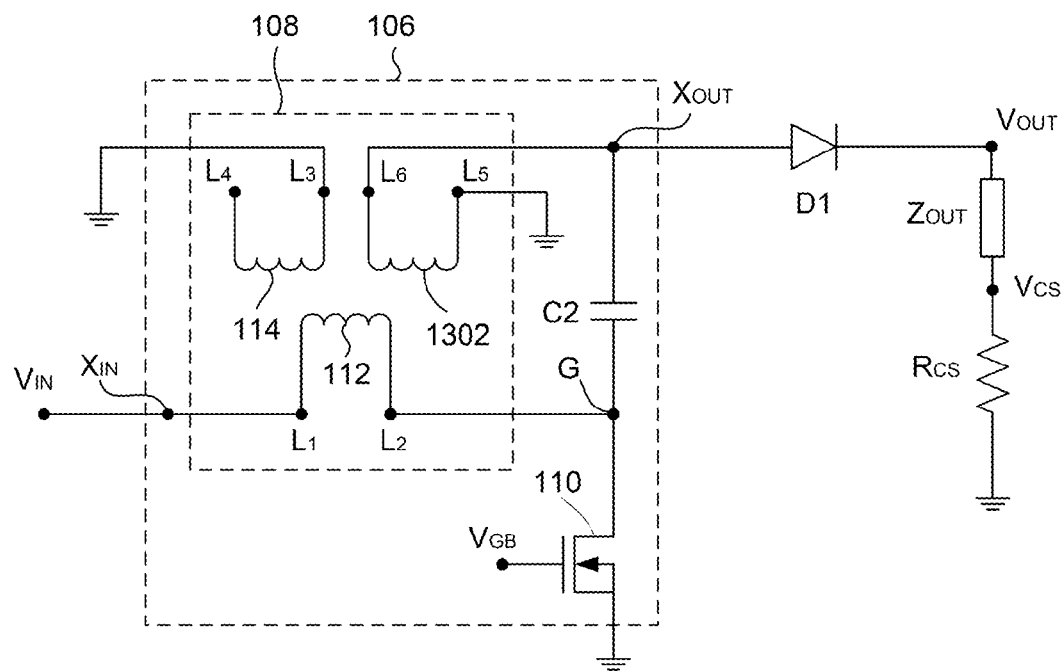
FIG. 13 shows a schematic diagram of inductive storage circuitry and switching circuitry configured in a single-ended primary inductor power converter (SEPIC) topology.

FIG. 13 shows the inductive storage circuitry 108 and the switching circuitry 110 configured in an example single-ended primary inductor (SEPIC) power converter topology. The first winding 112 may be a first inductor and the second winding 114 may be a second inductor. The first end $L_1$ may be coupled to the input terminal $X_{IN}$ and the input voltage $V_{IN}$. The second end $L_2$ may be coupled to the output terminal $X_{OUT}$ via a capacitor C2. In particular, the second end $L_2$ of the first inductor 112 may be connected to the capacitor C2 at a node G, where a drain terminal of the NMOS transistor 110 may also be connected. A source terminal of the NMOS transistor 110 may be coupled to ground. The inductive storage circuitry 108 may further include a third inductor 1302 having a first end $L_5$ coupled to ground and a second end $L_6$ coupled to the output terminal $X_{OUT}$. A voltage $V_{65}$ generated across the third inductor 1302 may be proportional to the voltage $V_{21}$ generated across the first inductor 112 according to a turns-ratio between the first and third inductors 112, 1302.

When the NMOS transistor 110 turns on, the second end $L_2$ may be pulled to ground and the voltage $V_{21}$ across the first inductor 112 may correspond to the input voltage $V_{IN}$. The diode D1 may be reversed biased and charge may be stored in the inductive storage circuitry 108. When the NMOS transistor 110 turns off, the voltage $V_{21}$ may correspond to the output voltage $V_{OUT}$, which may be forward bias the diode D1 and charge stored in the first inductor 112 and the third inductor 1302 may be discharged to the output load $Z_{OUT}$.

Figure 14:
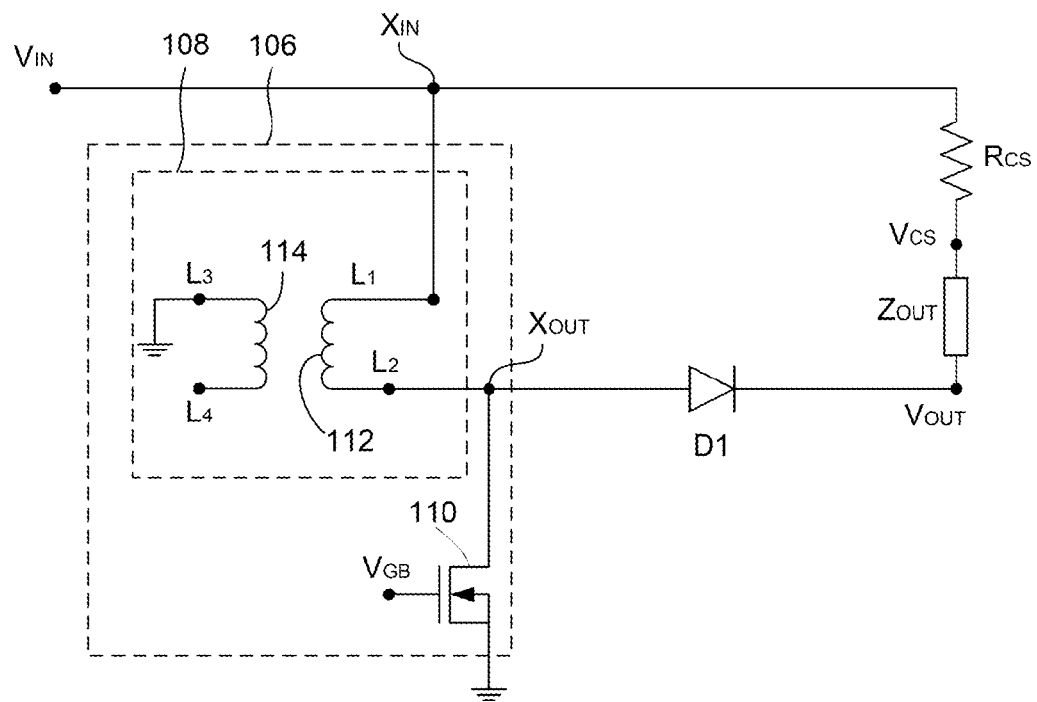
FIG. 14 shows a schematic diagram of inductive storage circuitry and switching circuitry configured in a buck-boost power converter topology.

FIG. 14 shows the inductive storage circuitry 108 and the switching circuitry 110 configured in an example buck-boost power converter topology. The example buck-boost power converter topology may differ from the other power converter topologies shown in FIGS. 11-13 in that the output voltage $V_{OUT}$ may be generated with respect to the input voltage $V_{IN}$ rather than with respect to ground. The outputs of the example switched mode power supplies 100, 600, 900 may be correspondingly modified. For the buck-boost topology shown in FIG. 14, the first winding 112 may be a first inductor and the second winding 114 may be a second inductor. The first end $L_1$ may be coupled to the input terminal $X_{IN}$ and the input voltage $V_{IN}$. The second end $L_2$ may be coupled to the output terminal $X_{OUT}$, which may be coupled to the diode D1 and a drain terminal of the NMOS transistor 110. A source terminal of the NMOS transistor 110 may be coupled to ground.

When the NMOS transistor 110 turns on, the second end $L_2$ may be pulled to ground and the voltage $V_{21}$ across the first inductor 112 may correspond to the input voltage $V_{IN}$. The diode D1 may be reverse biased and charge may be stored in the inductive storage circuitry 108. When the NMOS transistor 110 turns off, the voltage $V_{21}$ may correspond to the difference between the output voltage $V_{OUT}$ and the input voltage $V_{IN}$. The diode D1 may be forward biased and charge stored in the first inductor 112 may be discharged through the inductor 112 to the output load $Z_{OUT}$.

Figure 15:
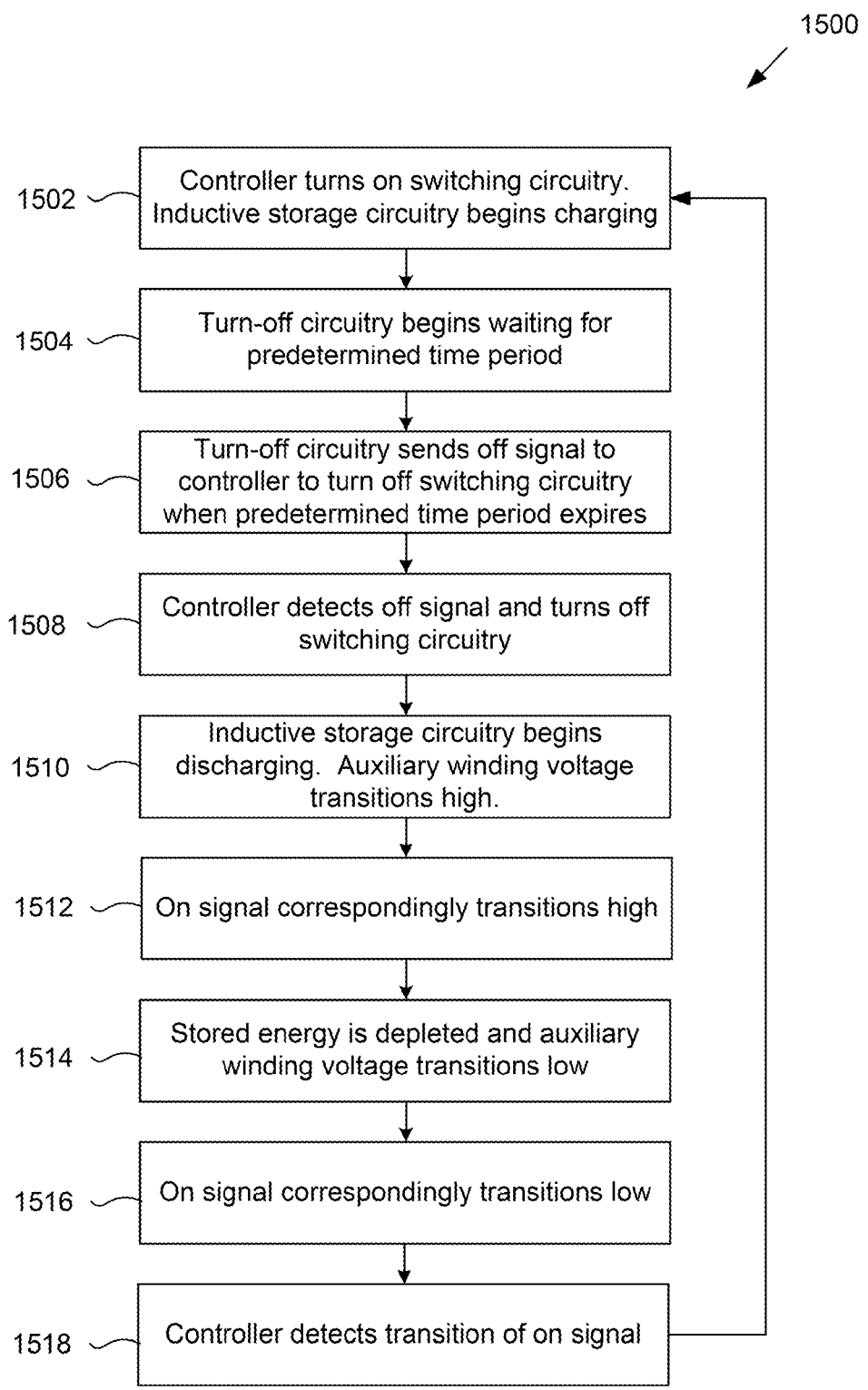
FIG. 15 shows a flow diagram of an example method of controlling switching circuitry of a switched mode power supply.

FIG. 15 shows a flow chart of an example method 1500 of controlling switching circuitry for a switched mode power supply. At block 1502, a controller circuit may turn on the switching circuitry to start a switching cycle. The controller circuit may turn on the switching circuitry in response to receiving an on signal and detecting a transition of the on signal from a high level to a low level. The on signal may be generated based on an auxiliary winding voltage generated across an auxiliary winding of inductive storage circuitry of the switched mode power supply. Additionally, the controller circuit may turn on the switching circuitry by transitioning a level of an output bias signal from a first level to a second level. When the switching circuitry turns on, inductive storage circuitry coupled to an input voltage may begin charging, and the amount that the inductive storage circuitry charges may be based on the input voltage.

At block 1504, in response to the controller circuit turning on the switching circuitry, turn-off circuitry may begin waiting for a time period before outputting an off signal to the controller circuit that triggers the controller circuit to turn off the switching circuitry. The turn-off circuitry may receive the bias signal from the switching controller and begin waiting when the turn-off circuitry detects a transition of the bias signal from the first level to the second level.

For some examples of the method 1500, the time period that the turn-on circuitry waits may be constant over multiple switching cycles, which may optimize or maximize the power factor of the switched mode power supply. Additionally, for some examples of the method 1500, the time period that the turn-off circuitry waits may be an amount of time that a ramp signal takes to change its voltage level from an initial ramp level to a threshold level. The time taken may be based on a level of the bias signal that turns on the switching circuitry and a time constant, such as a RC time constant, which may be fixed values. In accordance with the time constant, a rate at which the ramp signal changes its level may be the same over multiple switching cycles.

For some examples of the method 1500, the threshold level may be based on a sense voltage indicative of current drawn through an output load or an output voltage generated across the output load. As long as the sense voltage (i.e., the current drawn through an output load or the output voltage generated across the output load) is constant, the threshold level and the amount of time that the ramp signal takes to reach the threshold level may correspondingly remain constant over multiple switching cycles. However, if the sense voltage changes (i.e., the current drawn through or the output voltage generated across the output load changes), then the threshold level and the amount of time that the ramp signal takes to reach the threshold level may increase or decrease in proportion to the change in the sense voltage (i.e., the change in the amount of current being drawn or the amount of output voltage generated across the output load). The time period may expire when the level of the ramp signal reaches or exceeds the threshold level.

At block 1506, when the time period expires, the turn-off circuitry may output an off signal to the controller circuit to trigger the controller circuit to turn off the switching circuitry. In particular, the turn-off circuitry may transition the off signal from a first level to a second level. At block 1508, the controller circuit may receive the off signal and detect the transition of the off signal from the first level to the second level. In response to detecting the transition, the controller circuit may turn off the switching circuitry, such as by transitioning the bias signal from the second level back to the first level.

At block 1510, when the switching circuitry turns off, the inductive storage circuitry may begin discharging the stored charge as electrical current toward an output load connected to the switched mode power supply. Additionally, at block 1510, when the switching circuitry turns off, the auxiliary winding voltage may transition from the low level to the high level. At block 1512, in response to the auxiliary winding voltage transitioning to the high level, the on signal being received by the controller circuit may correspondingly transition to a high level, which may be referred to as arming the controller circuit.

At block 1514, the inductive storage circuitry may finish discharging the stored energy, and the energy stored in the inductive storage circuitry may be depleted. In response, the auxiliary winding voltage may transition back down to the low level. At block 1516, in response to the auxiliary winding voltage transitioning back down to the low level, the on sign may correspondingly transition down to a low level. At block 1518, in response to the transition, the controller circuit, receiving the on signal, may detect the transition from the high level to the low level. The example method 1500 may then proceed back to block 1502 where the controller circuit turns on the switching circuitry to start a next switching cycle in response to detecting the transition of the on signal.

Figure 16:
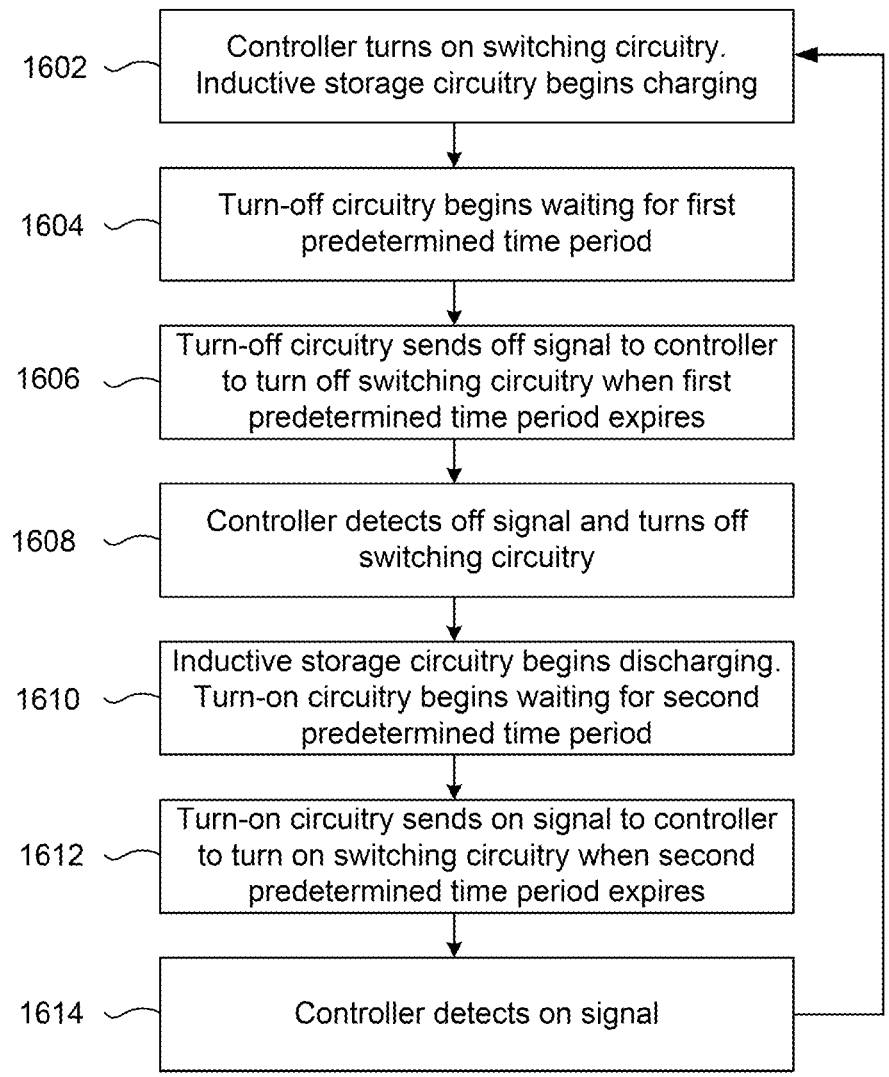
FIG. 16 shows a flow diagram of another example method of controlling switching circuitry of a switched mode power supply.

FIG. 16 shows a flow chart of another example method 1600 of controlling switching circuitry for a switched mode power supply. At block 1602, a controller circuit may turn on the switching circuitry to start a switching cycle. The controller circuit may turn on the switching circuitry in response to receiving an on signal from turn-on circuitry and detecting a transition of the on signal from a first level to a second level. Additionally, the controller circuit may turn on the switching circuitry by transitioning a level of an output bias signal from a first level to a second level. When the switching circuitry turns on, inductive storage circuitry coupled to an input voltage may begin charging, and the amount that the inductive storage circuitry charges may be based on the input voltage.

At block 1604, in response to the controller circuit turning on the switching circuitry, turn-off circuitry may begin waiting for a first time period before outputting an off signal to the controller circuit that triggers the controller circuit to turn off the switching circuitry. The turn-off circuitry may receive the bias signal from the switching controller and begin waiting when the turn-off circuitry detects a transition of the bias signal from the first level to the second level. For some example methods, the duration of the first time period may correspond to an amount of time that a first ramp signal takes to change its voltage level from an initial ramp level to a first threshold level. The time taken may be based on a level of the bias signal that turns on the switching circuitry and a time constant, such as a RC time constant, which may be fixed values so that the time that the first ramp signal takes to reach the first threshold level is constant over multiple switching cycles as long as a sense voltage indicative of the current being drawn through the output load or the output voltage generated across the output load is constant. The time period may expire when the level of the ramp signal reaches or exceeds the first threshold level.

At block 1606, when the time period expires, the turn-off circuitry may output an off signal to the controller circuit that triggers the controller circuit to turn off the switching circuitry. In particular, the turn-off circuitry may transition the off signal from a first level to a second level. At block 1608, the controller circuit may receive the off signal and detect the transition of the off signal from the first level to the second level. In response to detecting the transition, the controller circuit may turn off the switching circuitry, such as by transitioning the bias signal from the second level back to the first level.

At block 1610, when the switching circuitry turns off, the inductive storage circuitry may begin discharging the stored charge as electrical current toward an output load connected to the switched mode power supply. In addition, at block 1610, when the switching circuitry turns off, the turn-on circuitry may begin waiting for a second time period before outputting the on signal to the controller circuit to trigger the controller circuit to turn on the switching circuitry. The turn-on circuitry may receive the bias signal from the switching controller and begin waiting when the turn-on circuitry detects a transition of the bias signal from the second level back to the first level. For some examples of the method 1600, the duration of the second time period may correspond to an amount of time that a second ramp signal takes to change its voltage level from an initial ramp level to a second threshold level. The time taken may be based on a supply voltage and a time constant, such as a RC time constant, which may be constant over multiple switching cycles. The second time period may expire when the level of the second ramp signal reaches or exceeds the second threshold level.

At block 1612, when the second time period expires, the turn-on circuitry may output an on signal to the controller circuit that triggers the controller circuit to turn on the switching circuitry. In particular, the turn-on circuitry may transition the on signal from the first level to the second level. At block 1614, the controller circuit, receiving the on signal, may detect the transition from the first level to the second level. The method may then proceed back to block 1602 where the switching circuitry turns on the switching circuitry to start a next switching cycle in response to detecting the transition of the on signal.

Figure 17:
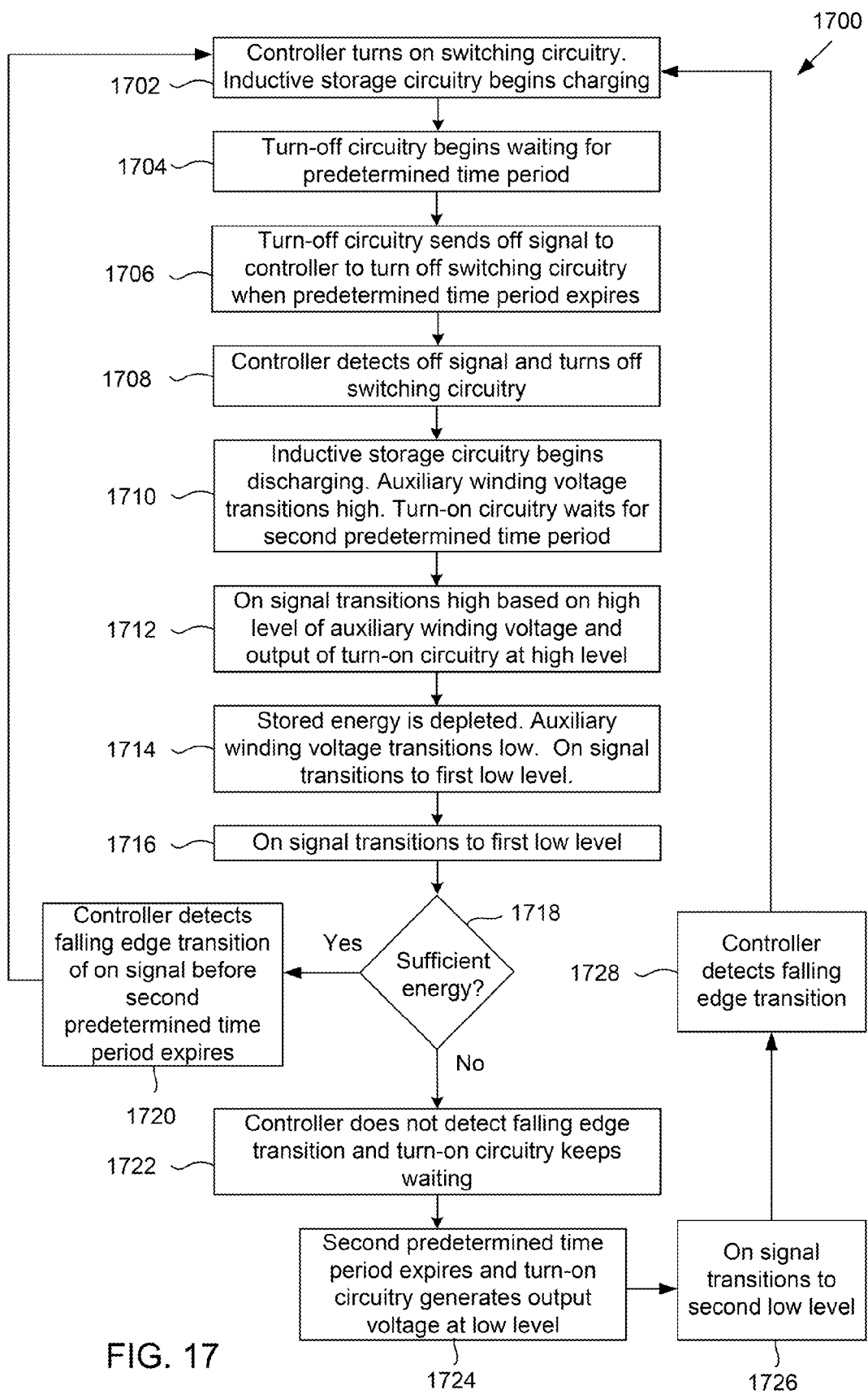
FIG. 17 shows a flow diagram of a third example method of controlling switching circuitry of a switched mode power supply.

FIG. 17 shows a flow chart of another example method 1700 of controlling switching circuitry for a switched mode power supply. At block 1702, a controller circuit may turn on the switching circuitry to start a switching cycle. The controller circuit may turn on the switching circuitry by transitioning a level of an output bias signal from a first level to a second level. When the switching circuitry turns on, the inductive storage circuitry may begin charging based on the input voltage. In addition, the controller circuit may turn on the switching circuitry in response to receiving an on signal and detecting a falling-edge transition of the on signal.

The on signal may be generated based on a combination of an auxiliary winding voltage generated across an auxiliary winding of inductive storage circuitry of the switched mode power supply and an output voltage generated by turn-on circuitry. The combination voltage may be generated based on a voltage division produced by a resistive network to which the auxiliary winding and output voltages are supplied. As described in further detail below, the falling-edge transition that is detected may be a transition from an associated high level to an associated first low level of the on signal, where the on signal is generated at the associated high level when both the auxiliary winding voltage and the output voltage of the turn-on circuitry are at associated high levels, and where the on signal is generated at the associated first low level when the auxiliary winding voltage is at an associated low level and the output voltage of the turn-on circuitry is at an associated high level. Alternatively, the falling-edge transition that is detected may be a transition of the on signal from the associated first low level to an associated second low level, lower than the first low level, where the on signal is generated at the associated second low level when both the auxiliary winding voltage and the output voltage of the turn-on circuitry are at associated low levels.

At block 1704, in response to the controller circuit turning on the switching circuitry, turn-off circuitry may begin waiting for a first time period before outputting an off signal to the controller circuit that triggers the controller circuit to turn off the switching circuitry. The turn-off circuitry may receive the bias signal from the switching controller and begin waiting when the turn-off circuitry detects a transition of the bias signal from the first level to the second level. For some example methods, the duration of the first time period may correspond to an amount of time that a first ramp signal takes to change its voltage level from an initial ramp level to a first threshold level. The time taken may be based on a level of the bias signal that turns on the switching circuitry and a time constant, such as a RC time constant, which may be fixed values such that the time that the ramp signal takes to reach the first threshold level may be constant over multiple switching cycles as long as a sense voltage indicative of either the current drawn through an output load or the output voltage generated across the output load remains constant. The time period may expire when the level of the ramp signal reaches or exceeds the first threshold level.

At block 1706, when the first time period expires, the turn-off circuitry may output an off signal to the controller circuit to trigger the controller circuit to turn off the switching circuitry. In particular, the turn-off circuitry may transition the off signal from a first level to a second level. At block 1708, the controller circuit may receive the off signal and detect the transition of the off signal from the first level to the second level. In response to detecting the transition, the controller circuit may turn off the switching circuitry, such as by transitioning the bias signal from the second level back to the first level.

At block 1710, when the switching circuitry turns off, the inductive storage circuitry may begin discharging the stored charge as electrical current toward an output load connected to the switched mode power supply. Additionally, at block 1710, when the switching circuitry turns off, the auxiliary winding voltage may transition from the low level to the high level. Also, at block 1710, when the switching circuitry turns off, the turn-on circuitry may begin waiting for a second time period before outputting the on signal to the controller circuit to trigger the controller circuit to turn on the switching circuitry. The turn-on circuitry may receive the bias signal from the switching controller and begin waiting when the turn-on circuitry detects a transition of the bias signal from the second level back to the first level. While the turn-on circuitry is waiting, the turn-on circuitry may generate the on signal at a high voltage level.

For some example methods, the duration of the second time period may correspond to an amount of time that a second ramp signal takes to change its voltage level from an initial ramp level to a second threshold level. The time taken may be based on a supply voltage and a time constant, such as a RC time constant, which may be constant over multiple switching cycles. The second time period may expire when the level of the second ramp signal reaches or exceeds the second threshold level. Additionally, the second time period may be set longer than a third time period that corresponds to an amount of time that the inductive storage circuitry takes to discharge the stored energy. The third time period may correspond to or be based on a minimum amount of energy stored in the inductive storage circuitry to generate the auxiliary winding voltage at a high level that provides a sufficient voltage swing, such as a voltage swing greater than or equal to a minimum voltage swing, needed to trigger the controller circuit to start a next switching cycle. Accordingly, when a sufficient amount of energy is stored in the inductive storage circuitry, a next switching cycle may begin upon depletion of the stored energy and before the second time period expires. Alternatively, when an insufficient amount of energy is stored in the inductive storage circuitry, and a next switching cycle may begin upon expiration of the second time period after the stored energy is depleted.

At block 1712, the on signal may be generated at a high level while the switching circuitry is turned off and the inductive storage circuitry is discharging the stored energy. The high level of the on signal may be based on a combination of the auxiliary winding voltage generated at its associated high level and the voltage of the output of the turn-on circuitry generated at its associated high level.

At block 1714, the inductive storage circuitry may finish discharging the stored energy, and the energy stored in the inductive storage circuitry may be depleted. In response, the auxiliary winding voltage may transition back down to the low level. At block 1716, in response to the auxiliary winding voltage transitioning back down to the low level, the voltage of the on signal may transition to a first low level based on a combination of the auxiliary winding voltage at its associated low level and the output of the turn-on circuitry generated at its associated high level.

At block 1718, if a sufficient amount of energy was stored in the inductive storage circuitry at the time that the controller circuit turned off the switching circuitry at block 1708, then at block 1720, the controller circuit may detect the transition of the on signal from the high level to the first low level as a falling-edge transition of the on signal high level. The controller circuit may detect the transition before the second time period expires. The example method 1700 may proceed back to block 1702, where the controller circuit, receiving the on signal, may turn on the switching circuitry to start a next switching cycle in response to detecting the falling edge transition.

Alternatively, at block 1718, if an insufficient amount of energy was stored in the inductive storage circuitry at the time that the controller circuit turned off the switching circuitry at block 1708, then at block 1722, the controller circuit may not detect a falling-edge transition of the on signal when the on signal transitions from the high level to the first low level, and the turn-on circuitry may continue waiting for the second time period. At block 1724, the second time period may expire and in response, the turn-on circuitry may transition its output from the high level to the low level. At block 1726, the on signal may transition from the first low level to a second low level that is based on a combination of the auxiliary winding voltage at its associated low level and the output of the turn-on circuitry generated at its associated low level.

At block 1728, the controller circuit may detect the transition of the on signal from the first low level to the second low level as a falling edge transition of the on signal. The example method 1700 may then proceed back to block 1702, where the controller circuit, receiving the on signal, may turn on the switching circuit to start a next switching cycle in response to detecting the falling edge transition.

The foregoing detailed description has described only a few of the many possible implementations of the present invention. For this reason, this detailed description is intended by way of illustration, and not by way of limitation.

What is claimed:

1. A switched mode power supply comprising:
    controller circuitry configured to output a bias signal to control switching of switching circuitry and to output the bias signal to turn off the switching circuitry upon expiration of a time period based, at least in part, on the bias signal; and
    turn-off circuitry configured to:
        receive the bias signal; and
        based on the received bias signal, generate and output an off signal that triggers the controller circuitry to output the bias signal to turn off the switching circuitry upon expiration of the time period.

2. The switched mode power supply of claim 1, wherein the time period is constant over multiple switching cycles.

3. The switched mode power supply of claim 1, wherein the turn-off circuitry is further configured to begin waiting for the time period when the bias signal turns on the switching circuitry.

4. The switched mode power supply of claim 1, wherein the turn-off circuitry is further configured to:
    generate a ramp signal having a level that changes over time based, at least in part, on the bias signal; and
    output the off signal in order to turn off the switching circuitry when the level of the ramp signal reaches a threshold level, wherein the time period expires when the level of the ramp signal reaches the threshold level.

5. The switched mode power supply of claim 4, wherein the level of the ramp signal further changes based on a time constant.

6. The switched mode power supply of claim 5, wherein the turn-off circuitry comprises resistor-capacitor circuitry, and wherein the time constant is based on a resistance and a capacitance of the resistor-capacitor circuitry.

7. The switched mode power supply of claim 6, wherein the turn-off circuitry is configured to generate the ramp signal at a node connecting a resistive component of the resistor-capacitor circuitry and a capacitive component of the resistor-capacitor circuitry.

8. The switched mode power supply of claim 5, wherein the level of the bias signal turns on the switching circuitry, and wherein the turn-off circuitry is configured to generate the ramp signal such that the level of the ramp signal changes based on the bias signal and the time constant when the controller circuitry outputs the bias signal at the level.

9. The switched mode power supply of claim 4, wherein the turn-off circuitry comprises:
    a comparator circuit that is configured to:
        compare the level of the ramp signal with the threshold level; and
        trigger the controller circuitry to output the bias signal to turn off the switching circuitry based on the comparison.

10. The switched mode power supply of 9, wherein the threshold level is based on one of an amount of current drawn through an output load connected to the switched mode power supply or an amount of voltage generated across the output load.

11. The switched mode power supply of claim 10, wherein the threshold level changes in response to one of a change in the amount of the current drawn through the output load or a change in the amount of the voltage generated across the output load.

12. The switched mode power supply of 10, wherein the turn-off circuitry comprises an amplifier circuit that is configured to:
    receive a reference voltage and a sense voltage, the sense voltage indicative of one of the amount of current drawn through the output load or the amount of voltage generated across the output load; and
    output a threshold voltage at the threshold level to the comparator circuit, wherein the threshold level is indicative of a voltage difference between the sense voltage and the reference voltage.

13. The switched mode power supply of claim 1, wherein the controller circuitry is further configured to:
    detect a transition of the off signal from a first level to a second level; and
    output the bias signal to turn off the switching circuitry in response to detection of the transition, and
    wherein the turn-off circuitry is further configured to transition the off signal from the first level to the second level in response to expiration of the time period in order to trigger the controller circuitry to turn off the switching circuitry.

14. The switched mode power supply of claim 1, further comprising:
    a node at which an on signal is generated, wherein a level of the on signal is based on a voltage generated across an auxiliary winding of the switched mode power supply,
    wherein the controller circuitry is further configured to:
        detect when the on signal transitions from a first level to a second level; and output the bias signal to turn on the switching circuitry in response to detection of the transition of the on signal from the first level to the second level.

15. The switched mode power supply of claim 14, wherein the transition from the first level to the second level comprises a falling-edge transition.

16. The switched mode power supply of claim 1, further comprising inductive storage circuitry configured with the switching circuitry in one of: a boost power converter configuration, a flyback power converter configuration, a single-ended primary inductor power converter configuration, or a buck-boost power converter configuration.

17. A method of controlling switching circuitry of a switched mode power supply, the method comprising:
    outputting a bias signal to turn off the switching circuitry upon expiration of a time period based at least in part on the bias signal;
    while the bias signal turns on the switching circuitry, waiting, with turn-off circuitry, for the time period before outputting an off signal at a second level to trigger controller circuitry to output the bias signal to turn off the switching circuitry;
    transitioning, with the turn-off circuitry, the off signal from a first level to the second level in response to expiration of the time period; and
    detecting, with the controller circuitry, the transition of the off signal from the first level to the second level,
    wherein outputting the bias signal to turn off the switching circuitry upon expiration of the time period comprises outputting the bias signal in response to detecting the transition of the off signal from the first level to the second level.

18. The method of claim 17, wherein the time period is constant over multiple switching cycles.

19. The method of claim 17, further comprising:
    generating a ramp signal having a level that changes over time based, at least in part, on the bias signal; and
    detecting that a level of the ramp signal has reached a threshold level,
    wherein the time period expires when the level of the ramp signal reaches the threshold level.

20. The method of claim 19, further comprising:
    while the switching circuitry is turned on, changing the level of the ramp signal based on the bias signal and on a time constant.

21. The method of claim 19, further comprising:
    comparing, with a comparator circuit, the level of the ramp signal with the threshold level, wherein expiration of the time period is based on the comparison.

22. The method of claim 21, further comprising:
    receiving, with an amplifier circuit, a reference voltage and a sense voltage, the sense voltage indicative of one of an amount of current drawn through an output load connected to the switched mode power supply or an amount of voltage generated across the output load; and
    outputting, with the amplifier circuit, a threshold voltage at the threshold level to the comparator circuit, wherein the threshold level is indicative of a voltage difference between the sense voltage and the reference voltage.

23. The method of claim 17,
    wherein outputting the off signal comprises outputting, with the turn-off circuitry, the off signal to the controller circuitry.

24. The method of claim 17, further comprising:
    generating, at a node of the switched mode power supply, an on signal that triggers the controller circuitry to output the bias signal to turn on the switching circuitry, wherein a level of the on signal is based on a voltage generated across an auxiliary winding of inductive storage circuitry of the switched mode power supply.

25. The method of claim 24, wherein generating the on signal comprises transitioning the on signal from an associated high level to an associated low level in response to energy being depleted in the inductive storage circuitry.

26. The method of claim 17, wherein the switched mode power supply further comprises inductive storage circuitry configured with the switching circuitry in one of: a boost power converter configuration, a flyback power converter configuration, a single-ended primary inductor power converter configuration, or a buck-boost power converter configuration.

27. A lighting system comprising:
    a switched mode power supply comprising:
        circuitry configured to:
            output a bias signal to control switching of switching circuitry and to turn off the switching circuitry upon expiration of a time period based, at least in part, on the bias signal;
            generate a ramp signal having a level that changes over time based, at least in part, on the bias signal; and
            turn off the switching circuitry when the level of the ramp signal reaches a threshold level, wherein the time period expires when the level of the ramp signal reaches the threshold level; and
    a light source comprising one or more light emitting diodes connected to an output of the switched mode power supply.

28. The switched mode power supply of claim 1, wherein a duration of the time period is based, at least in part, on a level of the bias signal.

29. The method of claim 17, wherein a duration of the time period is based, at least in part, on a level of the bias signal.

30. The lighting system of claim 27, wherein a duration of the time period is based, at least in part, on a level of the bias signal.

* * * * *